United States Patent
Ramsundar et al.

(10) Patent No.: US 9,519,575 B2
(45) Date of Patent: Dec. 13, 2016

(54) CONDITIONAL ITERATION FOR A NON-VOLATILE DEVICE

(71) Applicant: Fusion-io, Inc., Salt Lake City, UT (US)

(72) Inventors: Bharath Ramsundar, Fremont, CA (US); Nisha Talagala, Livermore, CA (US); Swaminathan Sundararaman, Santa Clara, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 520 days.

(21) Appl. No.: 13/945,139

(22) Filed: Jul. 18, 2013

(65) Prior Publication Data
US 2014/0325115 A1 Oct. 30, 2014

Related U.S. Application Data
(60) Provisional application No. 61/816,104, filed on Apr. 25, 2013.

(51) Int. Cl.
G06F 12/02 (2006.01)
G06F 3/06 (2006.01)

(52) U.S. Cl.
CPC ......... *G06F 12/0238* (2013.01); *G06F 3/0611* (2013.01); *G06F 3/0656* (2013.01); *G06F 3/0688* (2013.01); *G06F 2212/7201* (2013.01)

(58) Field of Classification Search
CPC .. G06F 12/0238; G06F 12/0246; G06F 12/10; G06F 12/1009; G06F 12/1027; G06F 2212/7201; G06F 3/0611; G06F 3/0688; G06F 3/0656; G06F 3/0655; G06F 3/0659; G06F 3/0679; G06F 3/0613

USPC .......... 711/102, 103, 163, 203, 206, 207,711/E12.008
See application file for complete search history.

(56) References Cited

U.S. PATENT DOCUMENTS

| | | | | |
|---|---|---|---|---|
| 5,842,226 A | * | 11/1998 | Barton | G06F 12/08 711/153 |
| 6,377,500 B1 | * | 4/2002 | Fujimoto | G06F 12/0246 365/230.01 |
| 7,278,008 B1 | * | 10/2007 | Case | G06F 12/1036 710/26 |
| 2004/0193830 A1 | * | 9/2004 | Haren | G06F 12/10 711/202 |
| 2005/0231765 A1 | * | 10/2005 | So | G06F 17/30315 358/1.16 |
| 2009/0150599 A1 | * | 6/2009 | Bennett | G06F 11/1441 711/103 |
| 2009/0193185 A1 | * | 7/2009 | Cheng | G06F 12/0292 711/104 |
| 2010/0169544 A1 | * | 7/2010 | Eom | G06F 12/0246 711/103 |
| 2011/0119455 A1 | * | 5/2011 | Tsai | G06F 3/0608 711/154 |
| 2012/0102298 A1 | * | 4/2012 | Sengupta | G06F 17/30312 711/216 |

(Continued)

*Primary Examiner* — Michael Krofcheck
(74) *Attorney, Agent, or Firm* — Kunzler Law Group, PC

(57) ABSTRACT

Apparatuses, systems, methods, and computer program products are disclosed for conditional iteration. A method includes receiving a request comprising a condition. A method includes checking an address mapping structure for entries satisfying a condition for a request. A method includes providing a result for a request based on one or more entries satisfying a condition for a request.

20 Claims, 11 Drawing Sheets

(56) References Cited

U.S. PATENT DOCUMENTS

| | | | |
|---|---|---|---|
| 2013/0055249 A1* | 2/2013 | Vaghani | G06F 3/0617 718/1 |
| 2013/0080732 A1* | 3/2013 | Nellans | G06F 12/0246 711/206 |
| 2013/0262816 A1* | 10/2013 | Ronen | G06F 12/1027 711/207 |

* cited by examiner

CONDITIONAL ITERATION FOR A NON-VOLATILE DEVICE

CROSS-REFERENCES TO RELATED APPLICATIONS

This application claims the benefit of U.S. Provisional Patent Application No. 61/816,104 entitled "CONDITIONAL ITERATION FOR A NON-VOLATILE DEVICE" and filed on Apr. 25, 2013 for Bharath Ramsundar, et al., which is incorporated herein by reference.

TECHNICAL FIELD

The present disclosure, in various embodiments, relates to iterators and more particularly relates to a conditional iteration for a non-volatile device.

BACKGROUND

The processing and analysis of data, especially in large quantities, can be time consuming and can tax system resources. Further, data stored on a non-volatile storage device may have significant access times to read the data from the non-volatile storage device and load the data into volatile memory where operations may be performed on the data, the data may be processed or analyzed, or the like. Often more data is read from a non-volatile storage device than is needed for processing or analysis, further increasing the amount of time required, the amount of transfer bandwidth used, and the processing and memory overhead consumed.

Additionally, during data processing or analysis, large quantities of data may be transferred between kernel-space and user-space, where unwanted data is then discarded. Transferring unnecessary data from kernel-space to user-space may cause unnecessary context switches, memory transfers, or the like, causing additional inefficiencies for data processing and analysis.

SUMMARY

Methods are presented for conditional iteration. In one embodiment, a method includes receiving a request associated with an iteration condition. A method, in another embodiment, includes checking an address mapping structure for entries satisfying an iteration condition for a request. In a further embodiment, a method includes providing a result for a request based on one or more entries satisfying an iteration condition for a request.

Apparatuses are presented for conditional iteration. In one embodiment, a mapping module is configured to maintain a logical-to-physical mapping structure mapping logical addresses for data to locations for the data of a non-volatile memory medium. A condition module, in certain embodiments, is configured to locate an entry in a logical-to-physical mapping structure that satisfies a predicate of an iteration request. A result module, in one embodiment, is configured to return a result based on a located entry.

An apparatus, in another embodiment, includes means for traversing entries of a logical-to-physical mapping structure for a non-volatile storage device. In a further embodiment, an apparatus includes means for matching an entry in a logical-to-physical mapping structure to a filter definition without accessing a non-volatile storage medium of a non-volatile storage device. In one embodiment, an apparatus includes means for performing an action for the matching entry.

Systems are presented for conditional iteration. A non-volatile recording device, in one embodiment, comprises a non-volatile recording medium associated with a plurality of virtual storage units. In a further embodiment, a mapping module is configured to maintain a logical-to-physical mapping structure mapping logical addresses for data of a plurality of virtual storage units to locations for the data in a non-volatile recording medium. A conditional iteration module, in certain embodiments, is configured to service an iteration request from a client by identifying one or more entries in a logical-to-physical mapping structure that are associated with a virtual storage unit to which a client has access rights and that satisfy a condition parameter of an iteration request.

Computer program products are presented comprising a computer readable storage medium storing computer usable program code executable to perform operations for conditional iteration. In one embodiment, an operation includes identifying a filter condition from a request for a non-volatile storage device. An operation, in another embodiment, includes filtering logical addresses for a non-volatile storage device based on a filter condition. In a further embodiment, an operation includes performing an action for a request on data of filtered logical addresses.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
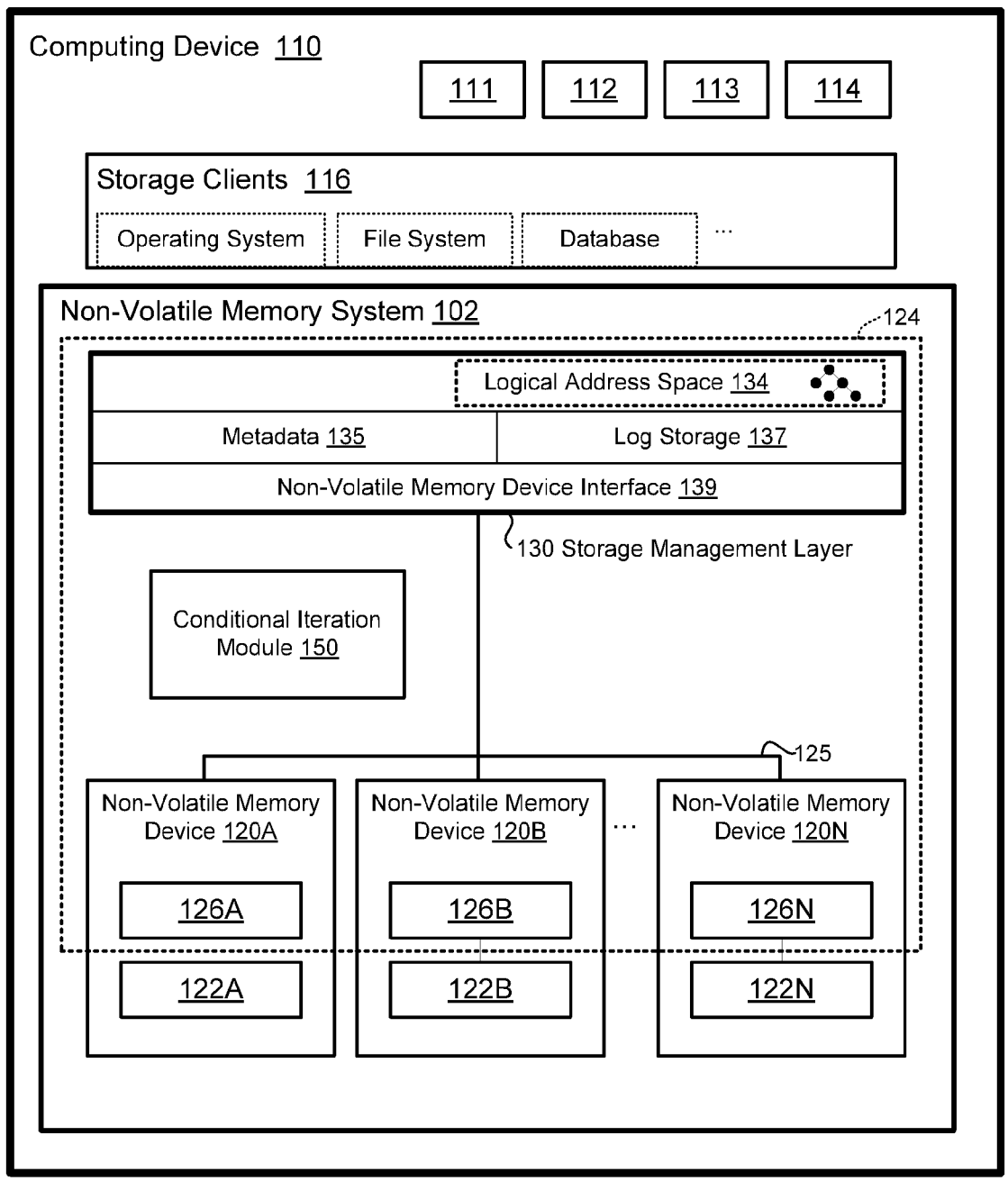
FIG. 1A is a schematic block diagram illustrating one embodiment of a system for conditional iteration.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), phase change memory (PRAM or PCM), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer (SML), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising $2^{32}$ unique logical addresses, each referencing 2048 bytes (2 KiB) of data may be $2^{43}$ bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A is a block diagram of one embodiment of a system 100 comprising a conditional iteration module 150. The conditional iteration module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as a Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
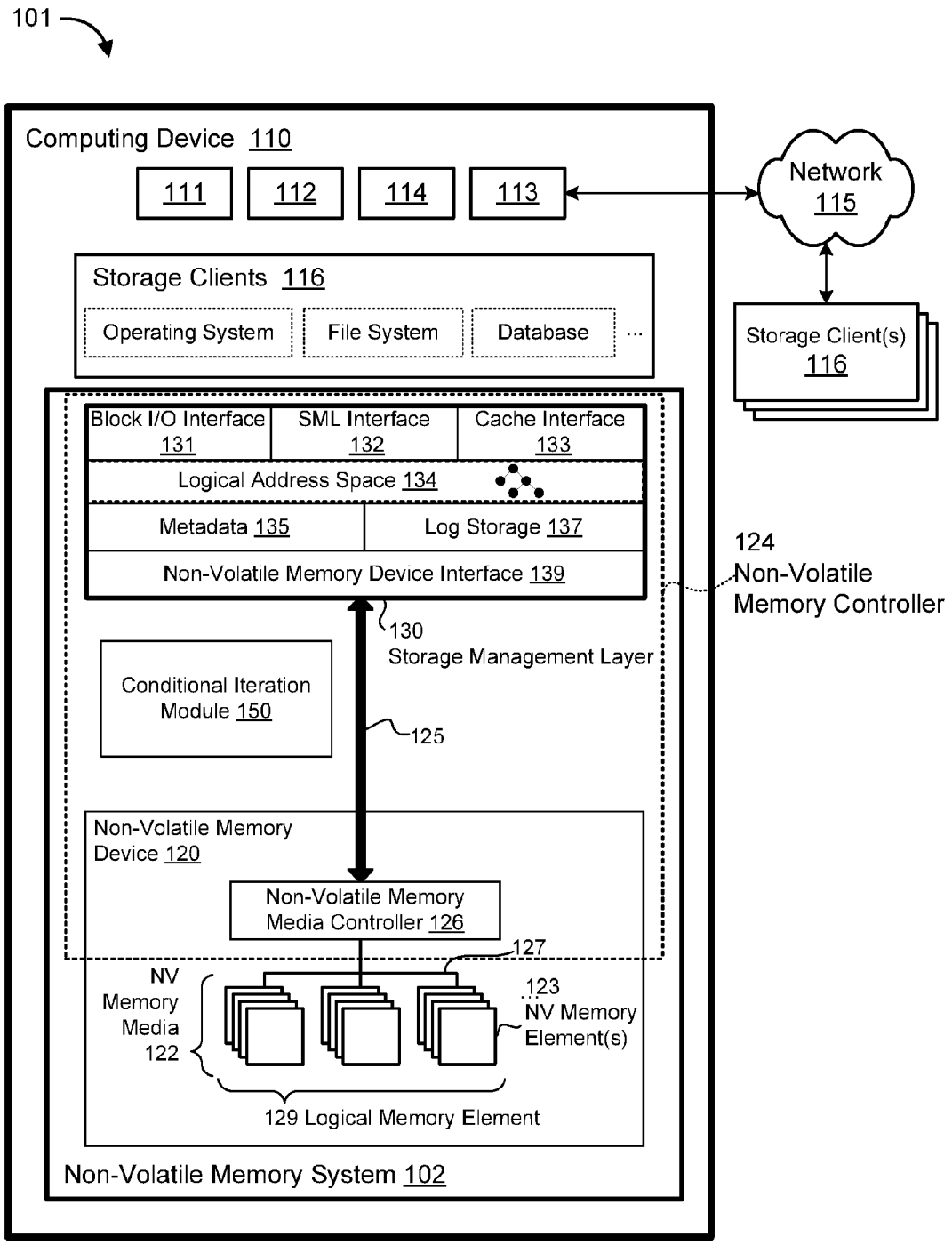
FIG. 1B is a schematic block diagram illustrating a further embodiment of a system for conditional iteration.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The non-volatile memory device interface 139 may communicate with the non-volatile memory devices 120A-N using input-output control (IO-CTL) command(s), IO-CTL command extension(s), remote direct memory access, or the like.

The non-volatile memory system 102, in the depicted embodiment, includes a conditional iteration module 150. The conditional iteration module 150, in one embodiment, is configured to service conditional iteration requests for data of the non-volatile memory device 120 based on a logical-to-physical mapping structure for the data, stored in the volatile memory 112 or the like. By filtering data using a logical-to-physical address mapping structure for the data already stored in the volatile memory 112, in certain embodiments, the conditional iteration module 150 may provide a client 116 the ability to select and/or process a custom subset of data from the non-volatile memory device 120, without unnecessarily reading excess data from the non-volatile memory device 120.

The conditional iteration module 150 may be configured to filter data by a time or sequence in which the data was written, allowing a client 116 to expire data older than a given time from the non-volatile memory device 120. In a further embodiment, the conditional iteration module 150 may be configured to filter data by a pool to which the data belongs, allowing a client 116 to select or classify data by pool without unnecessarily scanning or accessing the non-volatile memory device 120. The conditional iteration module 150 may satisfy a conditional iteration request from kernel-space, passing just a result to user-space. In this manner, the conditional iteration module 150 may leverage the sequential nature of the non-volatile memory device 120, using data or metadata already stored in the volatile memory 112, or the like. The conditional iteration module 150, in certain embodiments, may allow clients 116 to define custom conditions or queries for selecting custom subsets of data.

In one embodiment, the conditional iteration module 150 may comprise executable software code, such as a device driver, SML 130, or the like, stored on the computer readable storage media 114 for execution on the processor 111. In another embodiment the conditional iteration module 150 may comprise logic hardware of one or more of the non-volatile memory devices 120A-N, such as a non-volatile memory media controller 126A-N, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the conditional iteration module 150 may include a combination of both executable software code and logic hardware.

In one embodiment, the conditional iteration module 150 is configured to receive storage requests from the SML 130 via a bus 125 or the like. The conditional iteration module 150 may be further configured to transfer data to/from the SML 130 and/or storage clients 116 via the bus 125. Accordingly, the conditional iteration module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the conditional iteration module 150 may receive storage requests as an API call from a storage client 116, as an IO-CTL command, or the like. The conditional iteration module 150 is described in greater detail below with regard to FIGS. 3 and 4.

FIG. 1B is a block diagram of another embodiment of a system 101 comprising a conditional iteration module 150. As described above, the conditional iteration module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change memory (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
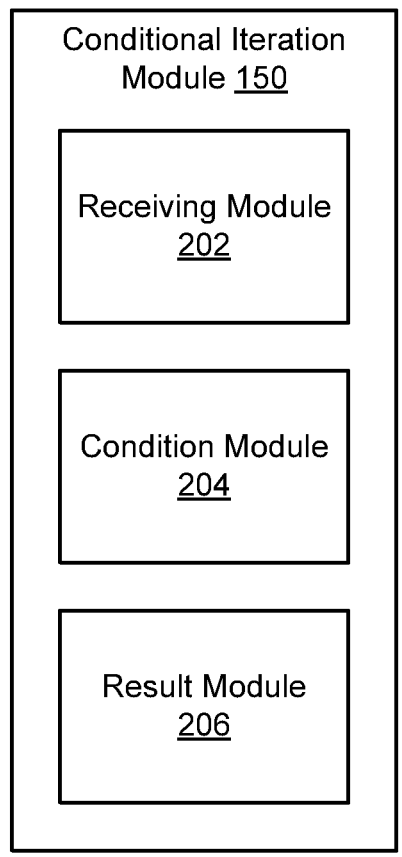
FIG. 2 is a schematic block diagram illustrating one embodiment of a conditional iteration module.

FIG. 2 depicts one embodiment of the conditional iteration module 150. The conditional iteration module 150 may be substantially similar to the conditional iteration module 150 described above with regard to FIGS. 1A and 1B. In general, as described above, the conditional iteration module 150 filters data based on logical addresses or other metadata for the data in a logical-to-physical mapping structure. In the depicted embodiment, the conditional iteration module 150 includes a receiving module 202, a condition module 204, and a result module 206.

In one embodiment, the receiving module 202 is configured to monitor, receive, or otherwise detect iteration requests from clients 116. An iteration request, as used herein, comprises a request, command, message, signal, or the like associated with an ordered iteration, traversing, or processing of data, metadata, logical or physical addresses, or the like for the non-volatile memory device 120 or another container.

An iteration request may be to initialize or instantiate an iterator, to increment or decrement an iterator, to request data, an address, or a key at a current iterator position, to request each data segment, address, or key that satisfies a condition, to request a previous or next data segment, address, or key that satisfies a condition, or the like. An iteration request may iterate or traverse data or a logical-to-physical address mapping structure for data in an address order (e.g., a forward address order by increasing address, a reverse order by decreasing address), in a sequential or chronological temporal order (e.g., from oldest to newest, from newest to oldest, based on a time data was written or the like), or in another order. As described below, in certain embodiments, a logical-to-physical address mapping structure may be sparsely populated, including entries only for data that the non-volatile memory device 120 stores data. In one embodiment, an iteration request may be for sparse iteration, iterating from one contiguous range of logical addresses to another contiguous range of logical addresses, skipping one or more unused or unoccupied logical addresses between the ranges. An iterator, as used herein, comprises a module, an object, a data structure, a handle, a pointer, a variable, or the like that indicates or provides access to data, metadata, an address, an address range, a key, or the like at a modifiable iterator position associated with the iterator. An iterator may be provided by the result module 206 in response to an iteration request, may be provided by and/or maintained by a client 116, or the like.

The receiving module 202 may detect an iteration request by receiving the iteration request directly, detecting an iteration request sent to a different module or entity, such as detecting an iteration request sent directly to a device driver, to the non-volatile memory device 120, or the like. In certain embodiments, the receiving module 202 may receive iteration requests over the block I/O interface 131, the SML interface 132, the cache interface 133, or the like.

The receiving module 202, in certain embodiments, may receive an iteration request as a system call received in kernel-space from a client 116 in user-space. In one embodiment, the receiving module 202 may receive an iteration request comprising an input/output control system call such as an IOCTL system call, a DeviceIoControl system call, or the like. An IOCTL system call, a DeviceIoControl system call, or another system call may include a request code associating the request with the non-volatile memory device 120, indicating that the request comprises an iteration request, or the like. As used herein, kernel-space may comprise an area of memory (e.g., volatile memory, virtual memory, main memory) of the host computing device 110; a set of privileges, libraries, or functions; a level of execution; or the like reserved for a kernel, operating system, or other privileged or trusted processes or applications. User-space, as used herein, may comprise an area of memory (e.g., volatile memory, virtual memory, main memory) of the host computing device 110; a set of privileges, libraries, or functions; a level of execution; or the like available to untrusted, unprivileged processes or applications.

Due to differences in privileges, access control restrictions, and the like, transferring data between kernel-space and user-space may cause unnecessary context switches, memory transfers, or the like. For this reason, in certain embodiments, the receiving module 202, the condition module 204, and/or the result module 206 may execute as a kernel module in kernel-space to determine a result for an iteration request, so that excess data is not transferred between kernel-space and user-space, extra context changes are not made, or the like.

The receiving module 202, in one embodiment, may be configured to receive and support different types of iteration requests. In certain embodiments, the receiving module 202 may receive iteration requests without conditions, to select or iterate through all data, through each logical address, through each key-value pair, or the like of the non-volatile memory device 120, without qualification. A key-value store module 306 is described in greater detail below with regard to FIGS. 3 and 6. In another embodiment, the receiving module 202 may receive iteration requests that include a condition or filter parameter identifying a subset of data, logical addresses, key-value pairs, or the like of the non-volatile memory device 120 associated with the iteration requests.

A condition or filter, as used herein, may comprise a definition, a statement, a function, an expression, a query, a predicate, a pattern, a mask, or the like which may be tested with or compared to a logical address, a physical address, data, metadata, a key of a key-value pair, a pool for a key-value pair, a data value of a key-value pair, time sequence metadata, or the like of the non-volatile memory device 120 to identify those that satisfy the condition or filter. The receiving module 202 and/or the condition module 204 may support a predefined syntax, language, grammar, library, or other structure for conditions or filters. For example, in various embodiments, the receiving module 202 and/or the condition module 204 may support executable code, one or more script instructions, regular expressions, structured query language (SQL) queries, conditional logic, bitmasks, and/or other formats or syntax for conditions or filters. In certain embodiments, as described below with regard to the condition library module 308 of FIG. 3, the receiving module 202 and/or the condition module 204 may support one or more predefined or preapproved conditions or filters, which may be selectable by a client 116 in an iteration request. References to a "condition" or "filter" herein, in certain embodiments, may also apply equally to a predicate, a filter definition, a condition definition, a condition statement, a filter condition, a condition parameter, a filter parameter, a mask, or another similar term.

In one embodiment, the receiving module 202 and/or the condition module 204 may support different types of iteration requests that apply to different targets. Examples of targets for an iteration request may include logical addresses, keys of key-value pairs, key-value pools, time sequence metadata (e.g., epoch identifiers, timestamps or the like), data of a logical address, metadata stored in an address mapping structure, or the like. In a further embodiment, a condition of an iteration request may define one or more targets to which the condition applies, as a variable, a parameter, a field, or the like of the condition. An iteration request, in various embodiments, may directly include a condition, may include a reference, a pointer, a flag, an index, an identifier, or an address for a condition, or the like. For example, in embodiments where an iteration request comprises an IOCTL command or other system call, the iteration request may include an integer value or other indicator identifying which condition applies from a predefined set or library of conditions.

The receiving module 202 may receive various types of iteration requests, such as an ITERATOR NIT command, a BEGIN command, a NEXT command, a PREVIOUS command, a GET CURRENT command, an EXPIRE command, a POOL command, or the like. As described in greater detail below with regard to the result module 206, different types of iteration requests may return different results. For example, in certain embodiments, a NEXT command, a PREVIOUS command, a GET CURRENT command, or the like may return a single result. In some embodiments, a NEXT command, a PREVIOUS command, or the like may increment or decrement a position of an iterator, but may not return an iteration result. Other iteration requests, such as a POOL command, a GET ALL command, or the like may return each result that satisfies a condition or filter. Certain iteration requests may be non-destructive or read only, and do not modify the logical-to-physical address mapping structure and/or data stored in the non-volatile memory device 120. Other iteration requests, such as an EXPIRE command, may be destructive, modifying the logical-to-physical address mapping structure and/or data stored in the non-volatile memory device 120.

For iteration requests that include a condition or filter, the receiving module 202 may parse the iteration request to identify the condition or filter and provide it to the condition module 204. In certain embodiments, an iteration request may include an indicator of, or otherwise be, associated with an action or operation to be performed with regard to one or more results, and the receiving module 202 may indicate the requested action or operation of an iteration request to the result module 206. For example, the receiving module 202 may receive and support an iteration request comprising an EXPIRE command, and the result module 206 may invalidate, delete, remove, clear, trim, or otherwise expire data satisfying a condition of the EXPIRE command.

In one embodiment, the condition module 204 receives a condition or filter for an iteration request from the receiving module 202 and determines one or more entries of a logical-to-physical address mapping structure that satisfy or match the condition or filter. Examples of logical-to-physical address mapping structures are described below with regard to the mapping module 302 of FIG. 3 and with regard to FIGS. 7A and 7B. An entry in a logical-to-physical address mapping structure may satisfy or match a condition or filter if the condition or filter includes or is true for a logical address or logical address range of the entry, for a key of a key-value pair of the entry, for a key-value pool of the entry, for a file or other data object of the entry, for metadata associated with the entry such as an epoch identifier, timestamp, or other time sequence metadata, or for another characteristic or attribute of the entry.

An entry may comprise a node, a portion of a node, a field, an element, a mapping, and/or another discrete unit of a logical-to-physical address mapping structure. As described below, in certain embodiments, each entry maps a logical address or logical address range for data to a physical location for the data in the non-volatile memory media 122. An entry, in further embodiments, may include metadata in addition to a logical-to-physical mapping, such as a read request count, read/write indicators, dirty/clean indicators, recent/frequent indicators, valid/invalid indicators, time sequence metadata (e.g., an epoch identifier, a timestamp, a date, a time) or other metadata associated with data of the mapping.

The condition module 204, in one embodiment, checks a logical-to-physical address mapping structure for one or more entries that satisfy a condition or filter of an iteration request by traversing, walking, or otherwise navigating the logical-to-physical address mapping structure and testing each traversed entry with the condition or filter. The condition module 204 may filter logical addresses based on a filter condition of an iteration request and provide one or more filtered logical addresses, corresponding data, corresponding keys, corresponding key-value pairs, or the like to the result module 206. Filtering logical addresses, in one embodiment, may comprise selecting one or more logical addresses that satisfy a condition or filter. In another embodiment, filtering logical addresses may comprise removing or unselecting one or more logical addresses that fail to satisfy a condition or filter. In certain embodiments, the condition module 204 may cooperate with the mapping module 302 and/or with the key-value store module 306 described below to scan the logical-to-physical address mapping structure to locate data segments that satisfy a condition or filter.

In certain embodiments, an iteration request may include an iteration order for fulfillment of the request. In other embodiments, a default iteration order may be used. An iteration order may include a logical address order, a key order, a chronological or sequential temporal order, a custom client-defined order, or the like. An iteration order may also be reversed and iterated in either direction (e.g., forward and backward, previous and next, older and newer). For example, an address order may include a forward address order by increasing address and/or a reverse order by decreasing address, a sequential or chronological temporal order from oldest to newest and/or from newest to oldest based on a time data was written, or the like. Accordingly, as used herein, the terms "next" and "previous" may be relative to a selected iteration order, and may be reversed or switched depending on the context, the selected iteration order, or the like.

In response to an iteration request for a single result (e.g., a NEXT command, a PREVIOUS command, or the like), the condition module 204 may traverse, walk, or otherwise navigate the logical-to-physical address mapping structure in a predefined iteration order until an entry satisfies or matches the condition or filter and may provide the entry to the result module 206. In response to an iteration request for a complete result set (e.g., an EXPIRE command, a POOL command, or the like), the condition module 204 may traverse, walk, or otherwise navigate the entire logical-to-physical address mapping structure, checking or testing each entry to determine whether it satisfies or matches the condition or filter to populate a complete result set for the result module 206. If an iteration order is requested that is different than a native order of the logical-to-physical address mapping structure (e.g., the mapping structure is traversable in address order but an iteration request is for a sequential, temporal order), the condition module 204, in certain embodiments, may navigate the logical-to-physical address mapping structure in the native, traversable order but may cooperate with the result module 206 to return one or more results according to the different requested iteration order. In one embodiment, the condition module 204 may traverse the entire logical-to-physical address mapping structure in a native iteration order to service an iteration request in a different requested iteration order.

In certain embodiments, the condition module 204 accesses entries of the logical-to-physical address mapping structure in volatile memory 112 of the host computing device 110, so that the condition module 204 may determine which entries of the logical-to-physical address mapping structure satisfy or match a condition or filter without accessing data in the non-volatile memory media 122 of the non-volatile memory device 120. Accessing data already in volatile memory 112 to satisfy iteration requests, in one embodiment, may complete in a much shorter time than reading and processing data from the non-volatile memory media 122, particularly for large amounts of data. In other embodiments, a condition or filter may include a parameter or element that relates to data or metadata stored in the non-volatile memory media 122, and the condition module 204 may scan or process data or metadata in the non-volatile memory media to satisfy the iteration request.

The condition module 204, in a further embodiment, may determine a result for an iteration request partially based on entries in a logical-to-physical address mapping structure in volatile memory 112 and partially based on data or metadata stored in the non-volatile memory media 122. For example, a condition or filter may define or select each file, data value, or other data object that is older than a certain date and that contains a certain string of text. To minimize the overhead of reading data from the non-volatile memory media 122, the condition module 204 may first use time sequence metadata stored in the logical-to-physical address mapping structure in volatile memory 112 to determine what data is older than the date and may then read just that data from the non-volatile memory media 122 to check or search for the string of text.

Rather than copying or transferring entries of the logical-to-physical address mapping structure from kernel-space to user-space and discarding entries that fail to satisfy a condition or filter of an iteration request, in one embodiment, the condition module 204 checks, determines, identifiers, and/or locates one or more entries that satisfy the condition or filter in kernel-space, so that entries that fail to satisfy the condition are not moved to user-space. In this manner, in certain embodiments, the condition module 204 may minimize memory transfers and/or context switches between kernel-space and user-space.

In one embodiment, a condition or filter may be for logical addresses such as LBAs, and the condition module 204 may evaluate a logical address and/or range of logical addresses of an entry with the condition or filter to determine whether the entry satisfies the condition or filter. In a further embodiment, a condition or filter may be for metadata stored with logical-to-physical mappings in entries of the logical-to-physical address mapping structure, and the condition module 204 may evaluate the metadata of an entry with the condition or filter to determine whether the entry satisfies the condition or filter. For example, the metadata may comprise time sequence metadata associated with a time or order in which data was written to the non-volatile memory device 120, such as an epoch identifier, a timestamp, a sequence number, a date, a time, or the like. A condition for time sequence metadata may include data written before a specified time, data written after a specified time, data written during a specified range of time, or the like.

In a further embodiment, a condition or filter may be for a key of a key-value pair (e.g., a key address portion of a logical address as described below). In embodiments where keys are hashed or otherwise translated into a key address portion, the condition module 204 may hash or otherwise translate a condition or filter or a portion thereof to compare the hashed or translated condition or filter with the key address portion of logical addresses of entries of the logical-to-physical address mapping structure. In one embodiment, a logical address of an entry may include a value address portion that does not encode the key for the key-value pair, but is sized to address at least a maximum size for a value of the key-value pair. The value address portion may be used to encode a pool identifier for the key-value pair as described above. A condition or filter of an iteration request may be for a key-value store pool identifier. In embodiments where a pool identifier is hashed or otherwise translated into a value address portion of a logical address, the condition module 204 may hash or otherwise translate a condition or filter or a portion thereof to compare the hashed or translated condition or filter with the value address portion of the logical address.

In certain embodiments where a key, a pool identifier, or the like is hashed or otherwise translated into a logical address, there may be a possibility of a collision, meaning that the hashed or translated value may match the condition or filter, but the actual key or pool identifier may not. To eliminate the chance of a hash collision, in one embodiment, in response to determining that a hashed key, a hashed pool identifier, or the like satisfies a condition or filter, the condition module 204 may read the actual key and/or pool identifier from the non-volatile memory media 122 to determine whether the actual key and/or pool identifier satisfies the condition or filter. Checking data or metadata read from the non-volatile memory media 122 just for entries that appear to satisfy a condition or filter, in certain embodiments, is more efficient than checking the non-volatile memory media 122 for each entry, and maintains many of the benefits of using a logical-to-physical address mapping structure in volatile memory 112 for iteration and/or filtering.

A condition of filter for an EXPIRE command may comprise a time before which data, key-value pairs, or the like is to be expired. The condition module 204 may determine which data, key-value pairs, or the like were written prior to the time of the EXPIRE command. A condition or filter for a POOL command requesting data, keys, key-value pairs, or the like for a pool, may comprise a pool identifier, a pool mask, and/or a pool hash, which the condition module 204 may use to locate members of the pool in the logical-to-physical address mapping structure. For example, the condition module 204 may perform a logical AND function with a logical address and a pool mask and validate or match the resulting value with a pool identifier or a pool hash to determine whether a key-value pair is a member of a pool.

The condition module 204, in one embodiment, may comprise a general purpose condition evaluation engine configured to receive an arbitrary condition, from an iteration request or the like, and to return data segments satisfying the condition. As described above, the condition module 204 may support a predefined syntax, language, grammar, library, or other structure for conditions or filters, such as executable code, one or more script instructions, regular expressions, structured query language (SQL) queries, conditional logic, bitmasks, and/or other formats or syntax for conditions or filters. The iteration request provided by the conditional iteration module 150 may be used as a primitive or foundational operation to implement one or more higher level operations such as a map operation, a filter operation, a reduce operation, or the like on one or more data segments of the non-volatile memory device 120.

In one embodiment, the result module 206 is configured to provide a result to a requesting client 116 and/or perform an action to satisfy or fulfill an iteration request received by the receiving module 202. The result module 206, depending on a type of the iteration request, may return a single result (e.g., a next result, a previous result, or the like relative to an iterator position in the logical-to-physical address mapping structure) or a result set including multiple results (e.g., a member for each entry that satisfies a condition or filter of an iteration request). A result may include one or more data segments, logical addresses, keys, key-value pairs, values of key-value pairs, or the like.

For iteration requests that include or reference a condition or filter, the result module 206 may receive one or more results identified by the condition module 204 that satisfy the condition or filter. The result module 206 may provide a result for an iteration request based on one or more entries that the condition module 204 has identified as satisfying a condition of the iteration request, returning a data segment for each entry, a logical address or logical address range for each entry, a key for each entry, a key-value pair for each entry, or the like.

The result module 206 may return a handle, identifier, pointer, or the like for an iterator, or an iterator itself, in response to an ITERATOR NIT command. In certain embodiments, the result module 206 may initialize the iterator to a default key and/or logical address, such as a first key and/or logical address that satisfies a condition, a first key or logical address sequentially, a first key or logical address temporally, a first populated logical address in a logical-to-physical address mapping structure, or the like. An ITERATOR NIT command may include a condition, a key-value store identifier, a pool identifier, or the like as a parameter.

As described above, an iterator may include a module, an object, a data structure, a handle, a pointer, a variable, or the like that indicates or provides access to data, metadata, an address, an address range, a key, or the like at a modifiable iterator position associated with the iterator. In certain embodiments, the result module 206 may include an encoded copy of the default initial key and/or logical address within the handle or identifier.

In response to a BEGIN command, the result module 206 may set an iterator to the beginning of a result set specified by a condition, a specified key-value store, a specified pool, or the like. A BEGIN command may include an iterator handle or identifier, a condition, a key-value store identifier, and/or a pool identifier as a parameter. In response to a NEXT command, the result module 206 may set the iterator to a next location in a result set specified by a condition, a specified key-value store, a specified pool, or the like. A NEXT command may include an iterator handle or identifier, an iteration order, a condition, a key-value store identifier, and/or a pool identifier as a parameter. In response to a PREVIOUS command, the result module 206 may set the iterator to a previous location in a result set specified by a condition, a specified key-value store, a specified pool, or the like. A PREVIOUS command may include an iterator handle or identifier, an iteration order, a condition, a key-value store identifier, and/or a pool identifier as a parameter. In a further embodiment, instead of or in addition to adjusting a position of an iterator, the result module 206 may return a result for the new position of the iterator in response to a NEXT command and/or a PREVIOUS command, as described below with regard to the GET CURENT command.

In one embodiment, a NEXT command and/or a PREVIOUS command may include a timeout value as a parameter. If the timeout value is set to zero or another predefined null value, the receiving module 202, the condition module 204, and/or the result module 206 may process the command until it completes. If the timeout value is set to another value specifying an amount of time, the receiving module 202, the condition module 204, and/or the result module 206 may timeout and stop processing the command if the command fails to complete within the specified amount of time. In certain embodiments, instead of or in addition to supporting a NEXT and/or a PREVIOUS command, the result module 206 may return an entire result set including each result of an iteration request, such as each logical address, each data block or segment, each key, each key-value pair, each data value, or the like that satisfies a condition of the iteration request. The result module 206, in certain embodiments, may fulfill a POOL command by returning one or more keys, key-value pairs, or the like associated with a pool identifier.

In response to a GET CURRENT command, in one embodiment, the result module 206 may retrieve data associated with a current logical address or range of logical addresses, a key-value pair or data value of a key-value pair, or the like of a current iterator location. The result module 206, in various embodiments, may return one or more data blocks or segments, a key, a data value, both a key and a data value, or the like in response to a GET CURRENT command. For a given iterator, in certain embodiments, the result module 206 may cycle through each result in the result set (e.g., each logical address, each logical address range, each key, each key-value pair, each data value, each data block or segment, each range of data blocks or segments, or the like) and returns each result exactly once, if no new results are added. The result module 206, in cooperation with the condition module 204 or the like, may return results in logical address order, in key order, in chronological or sequential order, in a custom client-defined order, or the like.

In certain embodiments, the result module 206 may perform one or more actions for entries that the condition module 204 determines satisfy a condition or filter of an iteration request. In one embodiment, the result module 206 may fulfill an EXPIRE command by invalidating, deleting, removing, clearing, trimming, or otherwise expiring data, key value pairs, or the like satisfying a condition or filter of the EXPIRE command. In certain embodiments, the result module 206 may return expired data, expired key value pairs, logical addresses for expired data, or the like in response to expiring data of an EXPIRE command.

The result module 206, in a further embodiment, may apply a map function to data satisfying a condition or filter in response to a MAP command, and may return the results of applying the map function. A map function may comprise a unary function to be applied separately to each member of a result set. The result module 206, in another embodiment, may apply a reduce function to data satisfying a condition or filter in response to a REDUCE command. A reduce function may combine members of a result set.

The conditional iterate module 150, in certain embodiments, may allow multiple iterators to execute in parallel and may allow multiple iterators to be active at a time. In one embodiment, if a key is inserted into a key-value store and/or a pool while an iterator for the key-value store and/or the pool is active, the result module 206 may not return the newly added keys. The conditional iteration module 150 may provide iterator use concurrent with PUT commands, write commands, or other storage operations.

Figure 3:
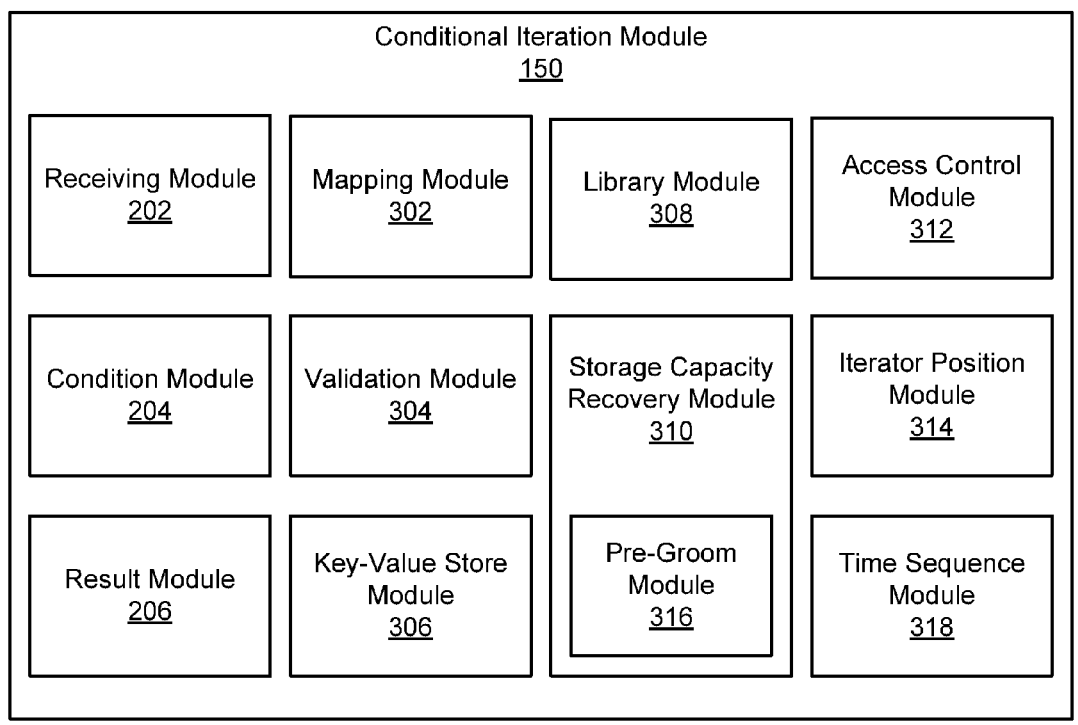
FIG. 3 is a schematic block diagram illustrating another embodiment of a conditional iteration module.

FIG. 3 depicts another embodiment of the conditional iteration module 150. The conditional iteration module 150 may be substantially similar to the conditional iteration module 150 described above with regard to FIGS. 1A, 1B, and 2. In the depicted embodiment, the conditional iteration module 150 includes the receiving module 202, the condition module 204, and the result module 206 and further includes a mapping module 302, a validation module 304, a key-value store module 306, a condition library module 308, a storage capacity recovery module 310, an access control module 312, an iterator position module 314, and a time sequence module 318.

In one embodiment, the mapping module 302 is configured to maintain a logical-to-physical address mapping structure that maps logical addresses for data to locations for the data in a sequential log-based structure of a non-volatile memory medium 122. The logical-to-physical address mapping structure is described in greater detail with regard to FIGS. 7A and 7B. As depicted in FIG. 7B, in certain embodiments, the mapping module 302 may store metadata, such as a read request count, one or more read/write indicators, dirty/clean indicators, recent/frequent indicators, valid/invalid indicators, time sequence metadata (e.g., an epoch identifier, a timestamp, a date, a time) or the like in entries of the logical-to-physical address mapping structure, so that iteration requests may reference the metadata in conditions or filters. The mapping module 302, in one embodiment, maintains the logical-to-physical address mapping structure in volatile memory 112 of the host computing device 110. In embodiments where the non-volatile memory device 120 is associated with one or more virtual storage units (VSUs) as described below with regard to FIG. 5, the mapping module 302 may store logical-to-physical mappings for multiple VSUs in a single logical-to-physical address mapping structure.

The logical-to-physical address mapping structure, in various embodiments, may include a B-tree, B*-tree, B+-tree, a CAM, a binary tree, a hash table, an index, an array, a linked-list, a look-up table, or another mapping data structure. Use of a B-tree as the logical-to-physical address mapping structure in certain embodiments, is particularly advantageous where the logical address space presented to the client is a very large address space (such as 2^64 addressable blocks or the like—which may or may not be sparsely populated). Because B-trees maintain an ordered structure, searching such a large space remains very fast. For example, in one embodiment, the logical-to-physical address mapping structure includes a B-tree with multiple nodes and each node may store several entries. In the example embodiment, each entry may map a variable sized range of logical addresses of the non-volatile memory device 120 to a location (such as a starting location) on the physical storage media 122 of the non-volatile memory device 120. Furthermore, the number of nodes in the B-tree may vary as the B-tree grows wider and/or deeper.

In one embodiment, the logical-to-physical address mapping structure of the mapping module 302 only includes a node or entry for logical addresses of the non-volatile memory device 120 that are associated with currently cached data in the non-volatile memory device 120. In this embodiment, membership in the logical-to-physical address mapping structure represents membership in the non-volatile memory device 120. The mapping module 302, in one embodiment, adds entries, nodes, and the like to the logical-to-physical address mapping structure as data is stored in the cache and removes entries, nodes, and the like from the logical-to-physical address mapping structure in response to data being evicted, cleared, trimmed, or otherwise removed from the non-volatile memory device 120.

Similarly, membership in the logical-to-physical address mapping structure may represent valid allocated blocks on the non-volatile memory media 122. The non-volatile memory controller 124 (and/or the mapping module 302), in one embodiment, adds entries, nodes, or the like (e.g., mappings) to the logical-to-physical address mapping structure as data is stored on the non-volatile memory media 122 and removes entries, nodes, or the like (e.g., mappings) from the logical-to-physical address mapping structure in response to data being invalidated cleared, trimmed, or otherwise removed from the non-volatile memory media 122.

The mapping module 302, in one embodiment, may maintain metadata such as a read request count, one or more read/write indicators, dirty/clean indicators, recent/frequent indicators, valid/invalid indicators, time sequence metadata (e.g., an epoch identifier, a timestamp, a date, a time) or the like in entries for data in the logical-to-physical address mapping structure. Nodes, entries, records, or the like of the logical-to-physical address mapping structure, in one embodiment, may include information (such as physical addresses, offsets, indicators, etc.) directly, as part of the logical-to-physical address mapping structure, or may include pointers, references, or the like for locating information in memory, in a table, or in another data structure. The mapping module 302, in one embodiment, optimizes the logical-to-physical address mapping structure by monitoring the shape of the logical-to-physical address mapping structure, monitoring the size of the logical-to-physical address mapping structure, balancing the logical-to-physical address mapping structure, enforcing one or more predefined rules with regard to the logical-to-physical address mapping structure, ensuring that leaf nodes of the logical-to-physical address mapping structure are at the same depth, combining nodes, splitting nodes, and/or otherwise optimizing the logical-to-physical address mapping structure.

The mapping module 302, in one embodiment, periodically persists the logical-to-physical address mapping structure from the volatile memory 112 to the non-volatile memory media 122 of the non-volatile memory device 120. By storing the logical-to-physical address mapping structure to the non-volatile memory device 120, in a further embodiment, the mappings of logical addresses of the non-volatile memory device 120 to locations on the physical non-volatile memory media 122 of the non-volatile memory device 120 are persistent, may be reloaded, or the like even if the non-volatile memory device 120 is subsequently paired with a different host computing device 110.

In one embodiment, the validation module 304 is configured to validate and/or verify whether a condition, filter, action, and/or function defined by or received from a client 116, a user, or the like is secure and/or safe for the condition module 204. For example, in certain embodiments, the condition module 204 may apply a condition, filter, action, and/or function to entries in a logical-to-physical address mapping structure in kernel-space. Using, in kernel-space, an arbitrarily defined condition, filter, action, and/or function received from user-space, may be insecure, and may damage data, interfere with applications, or the like. The validation module 304 may use one or more rules, policies, parameters, or the like to analyze a condition, filter, action, and/or function, to determine whether it is secure, can be trusted, and is safe to use in kernel-space.

In one embodiment, the validation module 304 provides an interface for a user or other client 116 to submit a condition, filter, action, and/or function to a vendor, manufacturer, supplier, maintainer, or the like for validation. In another embodiment, the validation module 304 may validate a condition, filter, action, and/or function in an automated manner locally on the host computing device 110. The validation module 304, in one embodiment, may block non-validated conditions, filters, actions, and/or functions from being used. In a further embodiment, a user or other client 116 may override rejection or manually validate a condition, filter, action, and/or function, allowing it to be used even if the validation module 304 fails to validate it. Validated conditions, filters, actions, and/or functions may be included in a kernel module, added to a condition library, or the like.

In certain embodiments, the validation module 304 may validate conditions, filters, actions, and/or functions dynamically as iteration requests are received from storage clients 116. In other embodiments, the validation module 304 may support a "check-in" process or the like, and may validate conditions, filters, actions, and/or functions without an iteration request, in response to a separate validation request or validation event for the condition, filter, action, and/or function.

In one embodiment, the key-value store module 306 maintains one or more key-value stores on the non-volatile memory device 120. Key-value stores and the key-value store module 306 are described in greater detail below with regard to FIG. 5. In general, the key-value store module 306 provides access to stored data values indexed by keys. The key-value store module 306, in certain embodiments, may divide a key-value store into multiple key-value pools, which may be owned by and accessible to different clients 116 or the like.

The key-value store module 306, in one embodiment, stores a data value for a key-value pair to the non-volatile memory device 120, in response to a PUT command or the like for an associated key, using an ATOMIC WRITE operation to guarantee the atomicity of the data value, updates to the data value, and the like. An ATOMIC WRITE operation, in certain embodiments, provides variable size writes to accommodate variable sized data values. The key-value store module 306, in a further embodiment, in response to a GET command or the like for an associated key, uses an EXISTS operation to determine whether the non-volatile memory media 122 stores a data value for the key. For example, in one embodiment, membership in a logical-to-physical address mapping structure for the non-volatile memory device 120, as described above with regard to the mapping module 202, denotes storage, or existence, in the non-volatile memory media 122 and an EXISTS operation queries the logical-to-physical address mapping structure to ascertain existence or storage of a data value.

In response to a DELETE command or the like for a key, in one embodiment, the key-value store module 306 uses a persistent TRIM (PTRIM) operation to delete, erase, remove, or otherwise clear the associated data value from the non-volatile memory media 122. A PTRIM operation, in certain embodiments, operates atomically to clear data values from the non-volatile memory media 122 to free the associated physical capacity of the non-volatile memory media 122 for storing other data and to free the LBA associated with the cleared data values for association with other data. ATOMIC WRITE, EXISTS, and PTRIM operations, in certain embodiments, are primitive operations that the non-volatile memory controller 104 provides to the key-value store module 306, allowing the key-value store module 306 to store and retrieve variable sized data values efficiently without wasting physical storage capacity of the non-volatile memory media 122.

In one embodiment, the key-value store module 306 may manage a plurality of pools within a key-value store for clients 116. Clients 116, in certain embodiments, may manage key-value pairs in pools to group related key-value pairs, categorize key-value pairs, or the like. Pools may provide an abstraction to group or categorize logically related key-value pairs within a key-value store. Pools may enable clients 116 to manage key-value pairs more efficiently, by performing management operations for an entire pool instead of for individual key-value pairs, such as a pool or group delete or the like.

In certain embodiments, to make efficient use of the sparse logical address space, to avoid increased use of volatile memory and/or the non-volatile memory media 122, or the like, the key-value store module 306 may use the sparse logical address space of the non-volatile memory device 120, or of a VSU, to encode pool identifiers as an offset within a range of logical addresses for a key-value pair. By encoding pool identifiers into logical addresses of a sparse logical address space, the key-value store module 306 may organize a key-value store into key-value pools within a logical-to-physical address mapping structure, without separately storing, tracking, or mapping pool identifiers, thereby minimizing the overhead of providing key-value pools to clients 116. In one embodiment, encoding pool identifiers into logical addresses of a sparse logical address space may alleviate the need to allocate additional volatile memory to store a pool identifier for each key-value pair.

The conditional iteration module 150, in certain embodiments, includes a default iterator that iterates over logical addresses and/or keys for an entire key-value store, regardless of pools of the key-value store. If a BEGIN command, a NEXT command, a GET CURRENT command, or the like specifies a pool, the key-value store module 306 may cooperate with the conditional iteration module 150 to provide a pool level iterator. For a pool level iterator, in one embodiment, the conditional iteration module 150 iterates over logical addresses and/or keys for the entire key-value store as described above with regard to the default iterator, and determines a hash based on a pool identifier for the pool level iterator and a selected logical address and compares the resulting hash with an additional hash stored in the logical-to-physical address mapping structure as described above.

If the determined hash matches the stored additional hash, the logical address is associated with a key-value pair of the pool for the pool level iterator and the conditional iteration module 150 iterates to the selected logical address or key. If the determined hash fails to match the stored additional hash, the logical address is not associated with a key-value pair of the pool for the pool level iterator, and the conditional iteration module 150 continues to test subsequent logical addresses and/or keys until a member of the pool is located.

In embodiments where hash collisions may occur (due to large numbers of pools or the like), in addition to the matching check, the key-value store module 306 and/or the conditional iteration module 150 may retrieve key-value metadata from the non-volatile memory media 122 for the selected logical address to confirm that the pool identifier stored with the key-value metadata matches the pool identifier of the pool level iterator. In this manner, using the additional hash as a hint or preliminary check allows the key-value store module 306 and/or the conditional iteration module 150 to resolve at least a portion of false matches without reading key-value metadata from the non-volatile memory media 122, providing greater efficiency for a pool level iterator of the conditional iteration module 150 than if key-value metadata were read from the non-volatile memory media 122 for each iterated logical address and/or key. The key-value store module 306 may use the conditional iteration module 150 to implement pool iteration, pool deletion, key-value pair expiry, or the like as described above.

In one embodiment, the condition library module 308 provides a condition library comprising a plurality of predefined conditions, filters, actions, and/or functions from which a client 116 may select for iteration requests. For example, a predefined condition, filter, action, or function may include sequential iteration by time or address, skipping odd or even keys or logical addresses, or passing a bitmask to match with keys, logical addresses, or the like. The condition library, in certain embodiments, may be implemented in kernel-space.

The condition library module 308, in one embodiment, may index the conditions, filters, actions, and/or functions of the condition library, associate them with constant values, associate them with labels, or the like. A client 116 may include a constant value, label, or the like for an associated condition, filter, action, and/or function in an iteration request, such as an IOCTL system call or the like, thereby indicating to the conditional library module 308 which condition, filter, action, and/or function to use for the iteration request.

In certain embodiments, the condition library module 308 may add one or more conditions, filters, actions, and/or functions to the condition library over time. The condition library module 308 may add a condition, filter, action, and/or function to the condition library in response to the validation module 304 validating or approving the condition, filter, action, and/or function. In another embodiment, a user of other client 116 may manually add a condition, filter, action, and/or function to the condition library.

In one embodiment, the storage capacity recovery module 310 recovers storage capacity of the non-volatile memory device 120 one or more storage divisions at a time. A storage capacity recovery operation, in various embodiments, may comprise a garbage collection operation, a grooming operation, or the like. A storage division, in one embodiment, includes a logical or physical erase block or other predefined division. For flash memory, an erase operation on an erase block writes ones to every bit in the erase block. This may be a lengthy process compared to a program operation which starts with a location being all ones, and as data is written, some bits are changed to zero. Allowing the storage capacity recovery module 310 to operate autonomously and opportunistically within the non-volatile memory device 120 provides a way to separate erase operations from reads, writes, and other faster operations so that the non-volatile memory device 120 operates efficiently.

The storage capacity recovery module 310 may preserve the temporal and/or sequential order of data across a storage capacity recovery event or operation as the storage capacity recovery module 310 copies data forward on the sequential, log-based writing structure, using epoch identifiers or the like as described below with regard to the time sequence module 318. In certain embodiments, the storage capacity recovery module 310 is configured to copy data from a temporal range and one or more associated epoch identifiers forward to an append point of the sequential, log-based writing structure. In a further embodiment, the storage capacity recovery module 310 may copy data from a recovered temporal range of data or epoch to a different append point of the sequential, log-based writing structure than an intake append point, so that data from different temporal ranges or epochs remain separate in the sequential, log-based writing structure, or the like.

In embodiments where the storage capacity recovery module 310 preserves just a latest version of data for each temporal range or epoch, the storage capacity recovery module 310 may copy the latest version of data written in a temporal range or epoch forward to an append point of the sequential, log-based writing structure, and may erase, delete, remove, trim, or otherwise clear older invalid versions of the data during a storage capacity recovery operation. In other embodiments, the storage capacity recovery module 310 may preserve and copy forward multiple versions of data, both valid and invalid, from a temporal range or epoch.

As described below, in certain embodiments, the time sequence module 318 cooperates with the storage capacity recovery module 310 to identify data within a storage region the storage capacity recovery module 310 has selected for a storage capacity recovery operation. The time sequence module 318, in one embodiment, cooperates with the pre-groom module 316 to perform a pre-groom scan of a storage region selected for a storage capacity recovery operation, prior to the storage capacity recovery operation. The time sequence module 318 and/or the pre-groom module 316 may identify data of the storage region during the pre-groom scan, check or examine time sequence metadata for identified data of the storage region, and mark data invalid if an expiration period for the data has been satisfied. In this manner, the storage capacity recovery module 310 may assist in expiring data by recovering storage capacity of the storage region without writing the expired data to another storage region, so that the expired data is erased during the storage capacity recovery operation.

In one embodiment, the access control module 312 is configured to limit a result or result set from the result module 206 to entries, data, key-value pairs, files, or the like which a requesting client 116 has permission to access. For example, certain clients 116 may have access rights or permissions for certain VSUs, certain key-value pools, certain files, or the like while other clients 116 may not. The access control module 312, in certain embodiments, may limit a result or result set directly, by blocking or removing certain results. In another embodiment, the access control module 312 may limit a result or result set indirectly, by ensuring that the condition module 204 and/or the result module do not have access to results (e.g., entries, data, metadata, key-value pairs, files, or the like) which a requesting client 116 does not have permission to access, thereby limiting a search for results or the like.

The access control module 312 may enforce access controls or permissions of a file system, a VSU, a key-value pool or the like, preventing clients 116 from iterating through, accessing, expiring, modifying, deleting, or the like entries in the logical-to-physical address mapping structure and/or associated data for which a client 116 does not have permissions. The access control module 312, in one embodiment, cooperates with the result module 206 and/or the condition module 204 to skip or bypass results that a requesting client 116 does not have permission to access, restricting iterator function to key-value pools, logical addresses, data, or the like that the client 116 is authorized to access. The access control module 312 may authenticate access rights for an iteration request using an authentication mechanism such as RSA public-key encryption, data encryption standard (DES) encryption, or the like.

In one embodiment, the iterator position module 314 is configured to determine an iterator position in the logical-to-physical address mapping structure, facilitating execution of NEXT commands, PREVIOUS commands, and/or other contextual or state-based iteration requests. In one embodiment, the iterator position module 314 stores or maintains a state and/or location for an iterator, associating the state and/or location with an iterator identifier, or the like. A client 116 may include an iterator identifier in an iteration request, and the iterator position module 314 may provide a state and/or location for the associated iterator to the condition module 204. In another embodiment, the conditional iteration module 150 may be stateless, and instead of the iteration position module 314 storing or maintaining a state and/or location, a client 116 may include a previous result, a starting position (e.g., a logical address, a key), or the like in an iteration request. The condition module 204 may use a provided state and/or location, from the iterator position module 314, from an iteration request, or the like as a starting point in scanning or traversing the logical-to-physical address mapping structure to satisfy an iteration request.

As described above, the log storage module 137 may sequentially write data to an append point of a sequential, log-based writing structure preserved in the non-volatile memory media 122. The log storage module 137 may write data to the sequential, log-based writing structure in a temporal order in which the data is received from storage clients 116, in association with write requests or the like.

The log storage module 137, in certain embodiments, may write data sequentially within storage regions of the non-volatile memory media 122, such as logical or physical erase blocks, logical or physical pages, chips, dies, die planes, and/or other storage regions. In embodiments where the storage regions do not have a natural or predetermined order or sequence, the log storage module 137 may determine a sequentially ordered list of storage regions to maintain or track the order in which the storage regions are used in the sequential, log-based writing structure, thereby preserving the temporal order of data across different storage regions. One example of a sequential, log-based writing structure comprising an ordered set of erase blocks is described below with regard to FIGS. 4A, 4B, and 7A.

While the log storage module 137 writes data sequentially to a sequential, log-based writing structure, in certain embodiments, maintenance operations, such as a storage capacity recovery operation as described above with regard to the storage capacity recovery module 310, may interfere with the sequential order, causing certain data to become out of order. In one embodiment, the time sequence module 318 preserves a temporal order of the data in the sequential, log-based writing structure, even in the presence of interfering maintenance operations or the like. As used herein, a temporal order may include a chronological, sequential, or other time based order, such as an order in which data is received from storage clients 116, an order in which data is written to the non-volatile memory device 120, or the like.

As described above, the storage capacity recovery module 310 recovers storage capacity of the sequential, log-based writing structure by copying certain data from a selected storage region (e.g., a logical or physical erase block) forward to an append point of the sequential, log-based writing structure to preserve the data and erasing the selected storage region so that the selected storage region may be reused to store different data.

The time sequence module 318, in certain embodiments, marks or labels data in the sequential, log-based writing structure with sequence information, such as an epoch identifier, a span identifier, an era identifier, or the like that indicates a temporal and/or chronological order for data, even if the data is copied forward to an append point or other new location in the sequential, log-based writing structure. An epoch identifier, as used herein, comprises an indicator, marker, label, flag, field, packet, or other data structure identifying or preserving a temporal and/or sequential order for data in a sequential, log-based writing structure.

An epoch identifier may be absolute (e.g., a timestamp), relative (e.g., a sequence number), or may otherwise indicate a temporal and/or sequential order for data. The time sequence module 318, in one embodiment, may insert an epoch identifier into individual data segments, such as packets, error correcting code ("ECC") chunks or blocks, logical pages, physical pages, logical erase blocks, physical erase blocks, LBA data block or range of data blocks, files, data objects, or another predefined segment of data. For example, in one embodiment, a write pipeline may packetize data into discrete data packets and each data packet may include a metadata header, into which the time sequence module 318 may insert an epoch identifier for the data packet as the write pipeline and/or the log storage module 137 processes the data packets and writes them to the sequential, log-based writing structure.

The time sequence module 318, in one embodiment, may use a different epoch identifier for different data segments, incrementing the epoch identifiers between data segments or the like. In a further embodiment, the time sequence module 318 may mark or label a plurality of data segments with the same epoch identifier. For example, the time sequence module 318 may associate a temporal range, span, era, period, and/or epoch of data (e.g., data received and/or written within the same period of time) with a single epoch identifier. The time sequence module 318, in one embodiment, may insert copies of the single epoch identifier into metadata for each data segment associated with the temporal range. For example, the time sequence module 318 may store an epoch identifier in metadata packet headers for packets in the temporal range associated with the epoch identifier.

In another embodiment, the time sequence module 318 may mark or label an entire temporal range of data with an epoch identifier, without storing copies of the epoch identifier with each individual data segment within the temporal range. For example, the time sequence module 318 may store an epoch identifier at a beginning, end, and/or another predefined location within a temporal range of data. In one embodiment, the time sequence module 318 may store an epoch identifier or marker at the beginning of each new temporal range of data or epoch, so that the data between epoch identifiers is associated with the beginning epoch identifier. The time sequence module 318, in certain embodiments, may mark both the beginning and the end of a temporal range with the same epoch identifier. In a further embodiment, the time sequence module 318 may use a beginning epoch identifier of a next temporal range as an end marker for a previous temporal range, or the like.

The time sequence module 318, in one embodiment, marks a temporal range with an epoch identifier in a dedicated epoch metadata packet or the like, writing an epoch metadata packet to an append point of the sequential, log-based writing structure at the beginning and/or ending of a temporal range of data. In a further embodiment, the time sequence module 318 may insert a beginning and/or ending epoch identifier into metadata for a data segment, such as a metadata header or the like, associated with workload data of a storage client 116, or the like, without a dedicated epoch metadata packet. For example, the time sequence module 318 may store an epoch identifier in a packet header at the beginning of a temporal range, a packet header at the end of a temporal range, or the like. In certain embodiments, using an epoch identifier to mark the beginning and/or end of a temporal range may be more efficient than marking each data segment in the temporal range with an epoch identifier.

The time sequence module 318, in certain embodiments, increments an epoch identifier for association with each subsequent temporal range of data in the sequential, log-based writing structure. For example, the time sequence module 318, in one embodiment, may increment an epoch identifier in response to a new epoch request from a storage client 116, and may mark a subsequent temporal range of data with the incremented epoch identifier. In other embodiments, the time sequence module 318 may increment an epoch identifier automatically and/or periodically in response to a predetermined amount of time elapsing (e.g., a timer), a storage request, a write request invalidating data, and/or another epoch trigger. Incrementing an epoch identifier, in various embodiments, may comprise updating the epoch identifier to a current timestamp, adding a predetermined value to the epoch identifier, performing a predetermined transform on the epoch identifier, or otherwise changing a value of a current epoch identifier for use as a subsequent epoch identifier. In certain embodiments, each epoch identifier may be unique. In a further embodiment, the time sequence module 318 may reuse an epoch identifier in response to expiring a temporal range or epoch associated with the epoch identifier, so that a set of currently used epoch identifiers remains unique.

The time sequence module 318, in one embodiment, preserves a temporal and/or sequential order of data across a maintenance operation, such as a storage capacity recovery event, which copies, moves, or otherwise changes an order of data in a sequential, log-based writing structure, by ensuring that temporal ranges of data remain associated with their respective epoch identifiers. In certain embodiments, the time sequence module 318 may copy one or more epoch identifiers forward to an append point of a sequential, log-based writing structure as part of a storage capacity recovery event or the like, so that the associated data remains associated with the epoch identifiers in the sequential, log-based writing structure.

For example, if the time sequence module 318 stores epoch identifiers in metadata headers of data packets, the time sequence module 318 may ensure that the epoch identifiers remain in the metadata headers as the data packets are copied or written forward on the sequential, log-based writing structure. In a further embodiment, the time sequence module 318 may copy or write data forward an entire temporal range of data at a time, so that the temporal range of data remains co-located in the sequential, log-based writing structure. For example, the time sequence module 318 may copy a beginning and/or end epoch identifier forward on the sequential, log-based writing structure together with the temporal range of data.

In certain embodiments, the condition module 204 may access epoch identifiers or other time sequence metadata in the sequential, log-based writing structure to determine what data satisfies or matches a condition or filter of an iteration request. In another embodiment, the time sequence module 318 may store time sequence metadata, such as epoch identifiers, timestamps, sequence numbers, or the like in entries of the logical-to-physical address mapping structure, and the condition module 204 may access the time sequence metadata in the logical-to-physical address mapping structure to determine whether entries, logical addresses, data, keys, key-value pairs, or the like satisfy a condition or filter of an iteration request. Storing time sequence metadata in a logical-to-physical address mapping structure for use by the condition module 204 may provide faster access times than time sequence metadata stored in a sequential, log-based writing structure of the non-volatile memory media 122.

Figure 4A:
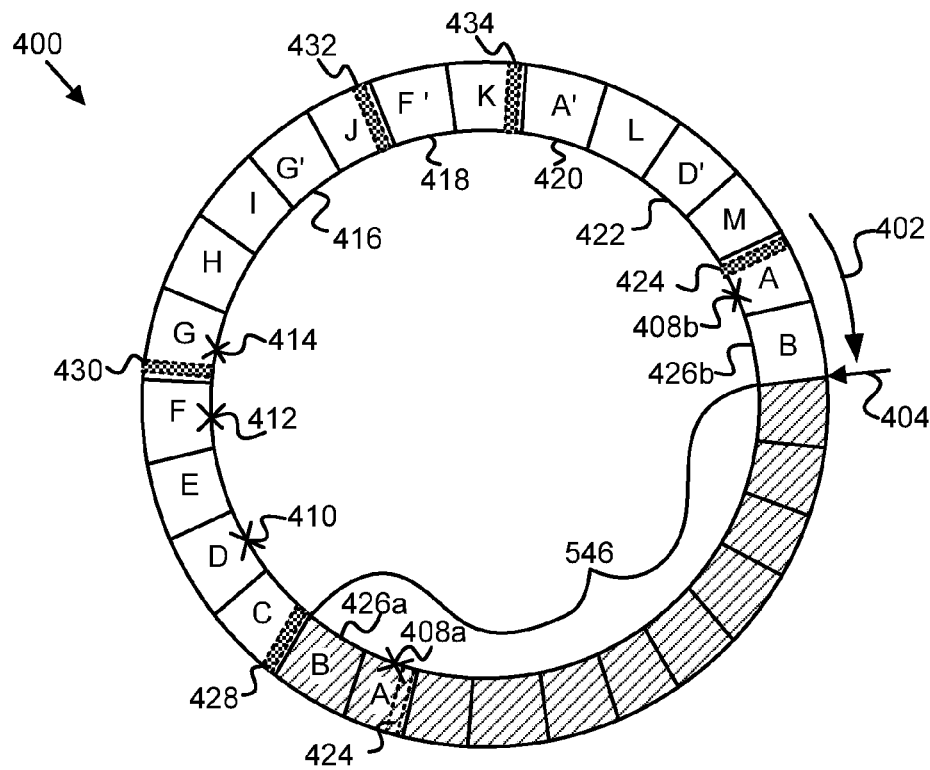
FIG. 4A is a schematic block diagram illustrating one embodiment of a sequential, log-based writing structure storing epoch identifiers.

FIG. 4A depicts one embodiment of a sequential, log-based writing structure 400 storing epoch identifiers 424, 428, 430, 432, 434 or other time sequence metadata to preserve a temporal order of data in the log-based writing structure 400 across storage capacity recovery operations or the like. The sequential, log-based, append-only writing structure 400, in the depicted embodiment, is a logical representation of the physical non-volatile memory medium 122 of the non-volatile memory device 120. In certain embodiments, the non-volatile memory device 120 stores data sequentially; appending data to the log-based writing structure 400 at one or more append points 404.

The non-volatile memory device 120, in a further embodiment, uses a storage space recovery, grooming, and/or garbage collection process, such as the storage capacity recovery module 310 described above, that re-uses non-volatile memory medium 122 storing deallocated, unused, and/or expired logical blocks. Non-volatile memory medium 122 storing deallocated, unused, and/or expired logical blocks, in the depicted embodiment, is added to an available storage pool 406 for the non-volatile memory device 120. By clearing invalid and/or expired data from the non-volatile memory device 120, as described above, and adding the physical storage capacity corresponding to the cleared data back to the available storage pool 406, in one embodiment, the log-based writing structure 400 is cyclic, ring-like, and has a theoretically infinite capacity.

In the depicted embodiment, the append point 404 progresses around the log-based, append-only writing structure 400 in a circular pattern 402. In one embodiment, the circular pattern 402 wear balances the non-volatile memory medium 122, increasing a usable life of the non-volatile memory medium 122. In the depicted embodiment, the storage capacity recovery module 310 has marked several blocks 408, 410, 412, 414 as invalid, represented by an "X" marking on the blocks 408, 410, 412, 414. The storage capacity recovery module 310, in one embodiment, will recover the physical storage capacity of the invalid blocks 408, 410, 412, 414 and add the recovered capacity to the available storage pool 406. In other embodiments, the storage capacity recovery module 310 may preserve at least a most recent copy of data from each temporal range or epoch in the invalid blocks 408, 410, 412, 414, so that the non-volatile memory controller 124 may provide access to snapshots or other previous states of the data to satisfy time sequence requests or the like. In the depicted embodiment, modified versions of the blocks 408, 410, 412, 414 have been appended to the log-based writing structure 400 as new blocks 416, 418, 420, 422 in a read, modify, write operation or the like, allowing the original blocks 408, 410, 412, 414 to be recovered.

An epoch identifier 424, 428, 430, 432, 434 or other time sequence indicator may include an indicator, marker, label, flag, field, packet, or other data structure identifying or preserving a temporal and/or sequential order for data in the sequential, log-based writing structure 400, to indicate a time at which the data was received and/or written, or the like. An epoch identifier 424, 428, 430, 432, 434 may be absolute (e.g., a timestamp), relative (e.g., a sequence number), or may otherwise indicate a temporal and/or sequential order for data.

In the depicted embodiment, the time sequence module 318 marks or associates data with an epoch identifier 424, 428, 430, 432, 434 by inserting the epoch identifier 424, 428, 430, 432, 434 into the sequential, log-based writing structure 400 between temporal ranges or epochs of data. An epoch identifier 424, 428, 430, 432, 434, in the depicted embodiment, marks the beginning of a new temporal range or epoch of data, with all data between the epoch identifier 424, 428, 430, 432, 434 and a subsequent or next epoch identifier 424, 428, 430, 432, 434 belonging to the temporal range.

In the depicted embodiment, the storage capacity recovery module 310 has performed a storage capacity recovery operation to recover blocks 408a and 426a which stored data 'A' and 'B' associated with the epoch identifier 424. To preserve the temporal and/or sequential order of data in the sequential, log-based writing structure 400, so that time sequence metadata remains accurate at a new location or the like, the time sequence module 318, in cooperation with the storage capacity recovery module 310, has copied or written forward the valid, unexpired data of the temporal range associated with the epoch identifier 424 (e.g., data 'A' and 'B') from blocks 408a, 426a to blocks 408b and 426b at the append point 404 of the sequential, log-based writing structure 400, along with the epoch identifier 424. Even though data 'A' of block 408a has been invalidated by new data, the storage capacity recovery module 310 retains data 'A' of block 408a during the storage capacity recovery operation, so that the non-volatile memory controller 124 may provide access to both versions of data 'A' 408, 420.

In this manner, the data remains associated with the epoch identifier 424 across storage capacity recovery events, so that the epoch identifier continues to indicate an age of the data so that the time sequence module 318 may expire the data at the correct expiration period, and so that the sequential, log-based writing structure 400 continues to maintain a temporal and/or sequential order of data. Additionally, by marking the beginning and/or ending of temporal ranges or epochs of data with epoch identifiers 424, 428, 430, 432, 434, in one embodiment, the sequential, log-based writing structure 4A preserves a temporal and/or sequential order for data without the overhead of storing an epoch identifier 424, 428, 430, 432, 434 in each packet or other predefined data segment.

Figure 4B:
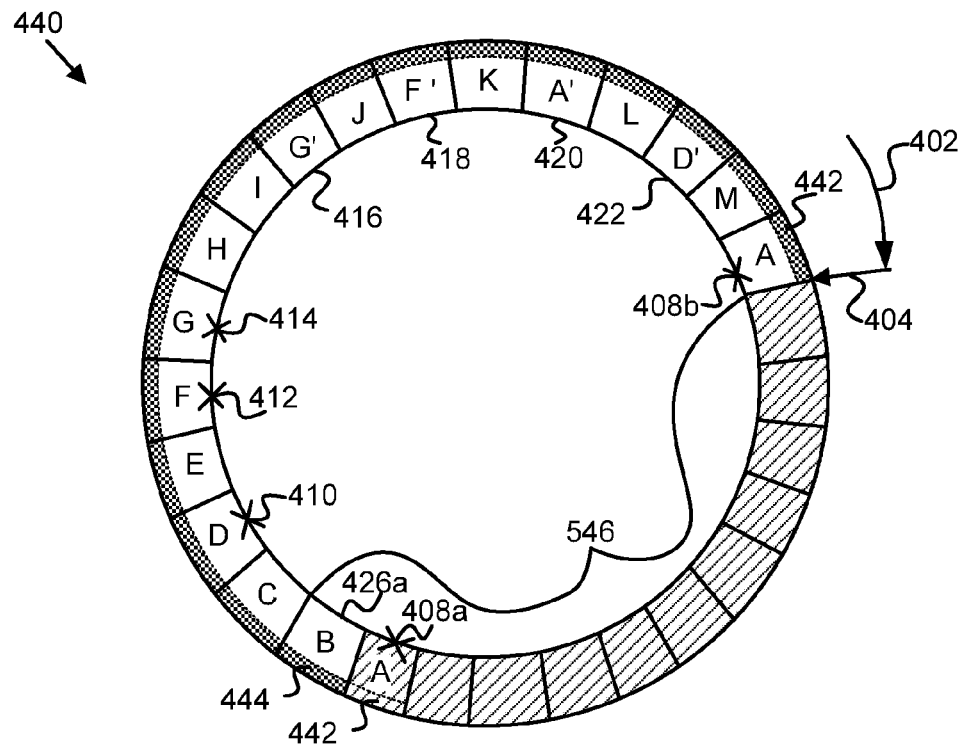
FIG. 4B is a schematic block diagram illustrating another embodiment of a sequential, log-based writing structure storing epoch identifiers.

FIG. 4B depicts another embodiment of a sequential, log-based writing structure 440 storing epoch identifiers 442, 444 or other time sequence indicators. In the sequential, log-based writing structure 440, the time sequence module 318 inserts or stores an epoch identifier 442, 444 into each individual data segment, such as a packet, an ECC chunk or block or codeword, a logical page, a physical page, a logical erase block, a physical erase block, an LBA data block or range of data blocks, a file, a data object, or another predefined segment of data.

In the depicted embodiment, because each individual packet or other data segment includes an epoch identifier, the storage capacity recovery module 310 may recover the storage capacity of block 408a, with data 'A', copying or writing forward data 'A' to a block 408b at the append point 404, without copying or writing forward data 'B' from block 426a, which may be associated with the same epoch identifier 444. Data packets or other data segments of data 'A' in block 408a store epoch identifiers 442, which the storage capacity recovery module 310 copies or writes forward with data 'A' to the new block 408b. The matching epoch identifiers 444a for data 'B' remain associated with data 'B', in each data packet or other data segment, in block 426a. In certain embodiments, storing an epoch identifier 442, 444 in each packet or other data segment may simplify storage capacity recovery operations for the storage capacity recovery module 310, as temporal ranges or epochs may be separated, without the data losing its association with the epoch identifiers 442, 644, so that the time sequence module 318 may expire the data at the correct expiration period even after the data is moved.

Figure 5:
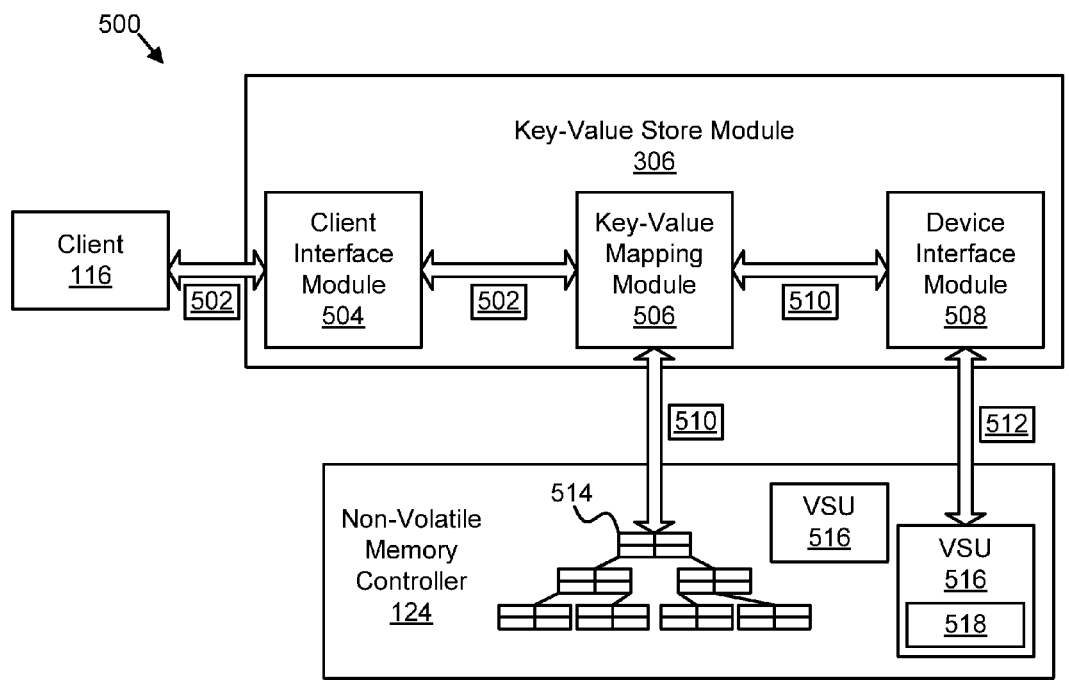
FIG. 5 is a schematic block diagram illustrating one embodiment of a system for a key-value store.

FIG. 5 depicts one embodiment of a system 500 for a key-value store 518. As described above, in various embodiments, the conditional iteration module 150 may be used with one or more general purpose non-volatile memory devices 120, with a key value store 518, with a cache, and/or with other types of non-volatile memory devices 120. The system 500 of FIG. 5 is one example embodiment, in which the conditional iteration module 150 is configured to provide conditional iteration for key-value pairs of a key-value store 518. The description may be equally applicable to other embodiments, in which the conditional iteration module 150 is configured to provide conditional iteration for user workload data, cached data, data objects, or other types of data. The system 500, in the depicted embodiment, includes a client 116, a key-value store module 306, and a non-volatile memory controller 124. The non-volatile memory controller 124 maintains one or more virtual storage units 516 or VSUs 516.

Each VSU 516 is a data structure maintained by the non-volatile memory controller 124 to logically divide the non-volatile memory device 120 into independent storage units or containers, so that the non-volatile memory device 120 may be shared between multiple clients 116, for multiple uses, or the like. Each VSU 516 may have different properties and attributes, such as different use cases, different expiration periods or parameters, different quality-of-service (QoS) levels, different priority levels, different logical address space types (e.g., sparse logical address space, contiguous logical address space), different replication attributes, different logical and/or physical storage capacities, different ownership, different access permissions, or the like. Clients 116, in certain embodiments, may independently create, delete, and manage VSUs 516. The non-volatile memory controller 124 may store metadata defining attributes of the VSUs 516 in volatile and/or nonvolatile storage of the computing device 110, the non-volatile memory device 120, or the like.

Attributes and metadata of a VSU 516 may be used to ensure high availability, to provide failover, or the like. For example, if a first VSU 516 encounters a fault, error, or otherwise fails, the non-volatile memory controller 124 may use the attributes and metadata of the failed first VSU 516 to migrate one or more clients 116 to a second VSU 516. The attributes of a failed VSU 516 may allow the non-volatile memory controller 124 to manage storage capacity allocation for a newly allocated VSU 516, to select a suitable VSU 516 as a failover candidate, or the like.

While the VSUs 516 depicted in FIG. 5 are logically associated with a single non-volatile memory controller 124, with physical non-volatile memory media 122 provided by a single non-volatile memory device 120, in another embodiment, the system 500 may include a plurality of non-volatile memory devices 120, a plurality of non-volatile memory controllers 124, or the like, each with associated VSUs 516. The non-volatile memory controller 124, in certain embodiments, may use a plurality of VSUs 516 in cooperation. For example, the non-volatile memory controller 124 may stack, layer, aggregate, export, and/or replicate one or more VSUs 516 to extend across multiple software layers, across data networks, across non-volatile memory devices 120, or the like. In other embodiments, the non-volatile memory controller 124 may stripe or mirror data to multiple VSUs 516, provide snapshots of one or more VSUs 516, or the like.

While each VSU 516 may be logically independent, in one embodiment, data stored in different VSUs 516 is intermingled in the non-volatile memory medium 122. For example, the non-volatile memory medium 122 may store data using a sequential, append-only, log-based writing structure, and the non-volatile memory controller 124 may write data of several VSUs 516 sequentially to an append point of the log-based writing structure as the key-value store module 306 receives data values from clients 116. Because data from each VSU 516, in certain embodiments, is written to the same append point, the data from different VSUs 516 may be dispersed throughout the log-based writing structure on the non-volatile memory medium 122.

By logically separating the data from different VSUs 516 but intermingling the data physically, data from each VSU 516 receives the same data protection characteristics. For example, the non-volatile memory controller 124, a write data pipeline, and/or a read data pipeline 108 provide certain data protection characteristics for data, such as error correction, garbage collection or storage capacity recovery, power cut or power loss protection, or the like to protect the integrity of data on the non-volatile memory medium 122. The non-volatile memory controller 124 applies these data protection characteristics to data regardless of which VSU 516 logically corresponds to the data.

Another benefit of storing data for VSUs 516 in a sequential, append-only, log-based writing structure as the non-volatile memory controller 124 receives data from clients 116, is that one or more of the VSUs 516 may be thinly provisioned, having a larger logical address space 134 than the physical storage capacity of the non-volatile memory medium 122. In a thinly provisioned embodiment, the non-volatile memory controller 124 may allocate physical storage capacity of the non-volatile memory medium 122 to a VSU 516 as the physical storage capacity is used, instead of allocating the entire storage capacity of the VSU 516 initially when the VSU 516 is created. Additionally, the non-volatile memory controller 124 may export a logical address space 134 for a VSU 516 to a client 116 (e.g., a sparse address space) that is much larger than the physical storage capacity of the non-volatile memory medium 122. The non-volatile memory controller 124 may provision the logical address space 134 when creating a VSU 516, and allocate physical storage capacity to the VSU 516 dynamically in response to a write request from a client 116.

The key-value store module 306, in the depicted embodiment, includes a client interface module 504, a key-value mapping module 506, and a device interface module 508. In one embodiment, the key-value mapping module 506 maps or otherwise associates data values with unique keys to form a key-value store 518.

The key-value store 518 maps keys to data values so that a client 116 can access the data values using the keys. The key-value mapping module 506, in certain embodiments, uses a logical-to-physical address mapping structure for the non-volatile memory device 120 to map keys to physical locations of the data values on the non-volatile memory medium 122. A location, as used herein, may comprise a physical address in the non-volatile memory medium 122, a logical address which the non-volatile memory medium 122 may map, interpret, or translate to a physical address, or another indicator of which storage elements of the non-volatile memory medium 122 store data. For example, the key-value mapping module 506 may use the logical-to-physical address mapping structure described above. In one embodiment, the key-value mapping module 506 does not maintain a separate key-value index or other mapping structure for a key-value store 518, but instead uses a logical address space 134 of the non-volatile memory device 120 (or of a VSU 516) and the logical-to-physical address mapping structure of the mapping module 302 to map keys to associated data values stored on the non-volatile memory medium 122.

In order to determine a logical address for a data value based on an associated key, in one embodiment, the key-value mapping module 506 performs one or more predefined or known transforms on the key, thereby converting the key to the logical address. A known transform may include a hash function, a truncation, a bit-masking, or another transformation or conversion that yields consistent, repeatable, deterministic, results. In one embodiment, a hash function may include a unity hash function where the output equals the input and the key-value mapping module 506 does not modify the key when converting the key to a logical address or key address portion of a logical address, thereby using the key itself as a logical address or key address portion. The key-value mapping module 506 may map a key to a logical address for an associated data value in response to a key-value command from a client 116 with the key, such as a PUT command to write or store a data value for the key, a GET command to retrieve the data value for the key, a DELETE command to delete the data value for the key, or the like. In certain embodiments, the key-value mapping module 506 converts or maps a key to a logical address without a key-value index or another key-value specific mapping structure. The key-value mapping module 506 may use the logical-to-physical address mapping structure and a logical address determined from a key to determine a physical location on the non-volatile memory medium 122 for a data value associated with the key.

In one embodiment, the logical address space 134 is sparse and/or thinly provisioned, and the key-value mapping module 506 determines a logical address for a key by dividing the logical address space 134 (for the non-volatile memory device 120, for a VSU 516, or the like) into one or more key address ranges and one or more value address ranges. The key-value mapping module 506 may divide a logical address space 134 by separating logical addresses of the logical address space 134 into a key address portion and a value address portion. Dividing the logical address space 134 and/or logical addresses of the logical address space 134, in certain embodiments, allows the key-value store module 306 to efficiently store data values of variable lengths while still using consecutive keys.

The key-value mapping module 506, in one embodiment, sizes the key address range and the value address range to accommodate a maximum data value size. For example, the key-value mapping module 506 may space addresses in the value address range at least a maximum data value size apart from each other. The maximum data value size, in certain embodiments, comprises a maximum allowed or supported size of a data value. In a further embodiment, the maximum data value size comprises a maximum allowed or supported size of a data value and key-value metadata stored with the data value such as an associated key, a size of the data value, an identifier of a client 116 or user associated with the data value, file system metadata, access control metadata, or the like.

The key-value mapping module 506, in one embodiment, assigns a key to a data value in response to receiving a write request or PUT command for the data value. In another embodiment, clients 116 manage their own keys and a client 116 sends a key to the key-value mapping module 506 with a write request or PUT command for a data value. The key, in certain embodiments, comprises a logical address or key address portion of a logical address directly, without manipulation. In a further embodiment, the key-value mapping module 506 maps or converts a key into a logical address or key address portion of a logical address. For example, the key-value mapping module 506 may perform a predefined transform, such as a hash function, on a key to convert the key to a logical address or key address portion of a logical address.

The key-value mapping module 506, in one embodiment, appends, concatenates or otherwise combines a determined key address portion of a logical address with a value address portion to form the logical address for an associated data value. In certain embodiments, the key-value mapping module 506 may use the same value address portion for each logical address, such as binary zeros, binary ones, or another predefined constant value. In another embodiment, the key-value mapping module 506 may logically use a predefined constant value for the value address portion of each logical address, but may store a different value in the bits for the value address portion in the logical-to-physical address mapping structure. In certain embodiments, the key-value mapping module 506 may store an additional hash value or other metadata in the value address portion.

In one example embodiment, if the non-volatile memory device 120 (or a VSU 516) has a sparse logical address space 134 of 248 blocks or sectors, with 48 bit logical addresses and a block/sector size of 512 bytes, to support a maximum data value size of about 1 mebibyte, the key-value mapping module 506 may segment logical addresses into two portions, a 37 bit key address portion and an 11 bit value address portion. In the example, by using a predetermined number of bits for the value address portion, 11 bits in the example, and using a predefined constant value for each value address portion (e.g., all zeros, all ones, a predefined value or bit pattern), the logical addresses for each data value are spaced the maximum data value size apart, 1 mebibyte in the example. In other embodiments, a sparse logical address space 134 of 264 blocks, 2128 blocks, or other sizes may be used, with the corresponding logical addresses segmented into a key address portion and a value address portion or the like.

In this manner, the key-value mapping module 506 logically segments or divides the sparse logical address space 134 (or a key-value portion of the sparse logical address space 134) into segments or chunks of a predetermined size, such as the maximum data value size, without allocating or using physical non-volatile memory medium 122 until a data value is written to the medium 122. By combining a key address portion and a value address portion to convert a key to a logical address, in certain embodiments, the key-value mapping module 506 allows values to have variable sizes while allowing clients 116 to use consecutively numbered keys.

In other embodiments, instead of using a key address portion and a value address portion, the key-value mapping module 506 may perform another transform on a key to convert the key into a logical address for the associated data value. For example, the key-value mapping module 506 may append a predefined sequence of bits to a key, add a predefined offset to a key, perform a predefined bitwise logic operation on a key, perform a hash on a key, or perform another predefined transform on a key to determine a logical address from the key. In embodiments where the key-value mapping module 506 uses one or more predefined or known transforms to convert a key to a logical address, whether using a key address portion and a value address portion or not, the key-value mapping module 506 may determine a physical location for a data value directly using the logical-to-physical address mapping structure, without a key-value index or other key-value specific structure to map keys to logical addresses or the like.

The key-value mapping module 506 may use a key directly, either as a key address portion of a logical address or as a logical address itself, or, in other embodiments, may perform a predefined transform such as a hash function to convert a key to a key address portion or to a logical address. In embodiments where the key-value mapping module 506 uses a non-unique transform such as a hash function to convert a key to a key address portion of a logical address or to a logical address, the key-value mapping module 506 may use one or more collision management techniques to handle collisions. For example, the key-value mapping module 506, in response to converting a received key to a logical address using a key address portion or otherwise, retrieves a stored key from key-value metadata stored at the logical address and compares the stored key to the received key to determine whether or not a collision has occurred. If the stored key does not match the received key, typically a hash collision has occurred. In certain embodiments, the sparse logical address space 134 is sufficiently large and the hash function is selected to evenly hash keys over an available key address range so that collisions occur infrequently, for example, in one embodiment, about 2% of the time or less.

The key-value mapping module 506, in one embodiment, may use one or more collision resolution techniques such as chaining, linear probing, quadratic probing, double hashing, or the like in response to a collision. For example, in response to a collision for a key-value pair, the key-value mapping module 506 may re-hash the key, the key and a pool identifier, or the like to a different logical address or logical address range. The key-value mapping module 506, in certain embodiments, may re-hash the key, the key and a pool identifier, or the like multiple times, until an available, collision-free logical address or logical address range is located. In another embodiment, the key-value mapping module 506 may send an error message or otherwise alert the key-value store module 306, a requesting client 116, or the like of a collision. In other embodiments, where a key-value store 518 operates as a cache for a key-value backing store or the like, in response to a subsequent data value colliding with a stored data value, the subsequent data value may take the place of the stored data value, invalidating and/or evicting the stored data value from the key-value store 518.

In one embodiment, the existence of an entry for a logical address in the logical-to-physical address mapping structure denotes membership of the key-value pair associated with the logical address in the key-value store 518 and storage of the associated data value on the non-volatile memory medium 122 of the non-volatile memory device 120. The key-value mapping module 506, in certain embodiments, dynamically updates the logical-to-physical address mapping structure as clients 116 add or remove key-value pairs from the key-value store 518. The key-value store 518, in other embodiments, may be substantially static, and pre-populated with data values and associated keys, by a manufacturer, vendor, administrator, or the like.

For new key-value pairs, in one embodiment, the key-value mapping module 506 determines, generates, or otherwise assigns a key for the new data value. In another embodiment, the key-value mapping module 506 receives a key for a new key-value pair from a requesting client 116 with a write request or PUT command for the new pair, and clients 116 may manage keys themselves. A key may comprise a binary or hexadecimal value, a string, an integer, or another data type that may have different unique values. As described above, in one embodiment, a key may comprise a logical address, a portion of a logical address, or the like. In other embodiments, a key may be converted, transformed, or hashed to a logical address or portion of a logical address.

In certain embodiments, a key for a data value may be a combination of several sub-values, such as a client identifier, a pool identifier, a key identifier, or the like. A client identifier identifies or is otherwise associated with a requesting client 116. In one embodiment, clients 116 of the same type share a client identifier. By sharing the same client identifier, clients 116 of the same type, in certain embodiments, may access the same data values in the key-value store 518. Sharing data values may allow clients 116 to maintain consistent settings or to otherwise coordinate or synchronize data. For example, if a non-volatile memory device 120 is installed in or otherwise paired with a first computing device 110, a device driver or other client 116 may access data values, store data values, and the like, and when the non-volatile memory device 120 is installed in or otherwise paired with a second computing device 110, a client 116 of the same client type may access the same data values, such as license information, settings, cache binding information, software, recovery information, or the like. In other embodiments, a client identifier may be unique, even among clients 116 of the same type, so that the clients 116 may maintain separate data values, without interference from other clients 116. Alternatively, clients 116 of the same type may share a client identifier, but may use unique pool identifiers for private data values that are not shared between clients 116, even of the same type.

A pool identifier identifies, or is otherwise associated with, a group of data values that have a common characteristic. Pool identifiers provide organization for data values, allowing the key-value mapping module 506 and/or clients 116 to classify, manage, or otherwise organize data values in the key-value store 518. For example, a client 116 may use one pool identifier for startup configuration settings and another pool identifier for runtime configuration settings, or the like. In one embodiment, a client 116 may assign and manage pool identifiers for data values associated with the client 116. In another embodiment, the key-value mapping module 506 assigns and manages pool identifiers for clients 116. In certain embodiments, the key-value mapping module 506 may encode a pool identifier into a logical address, as an offset within a range of logical block addresses, as the value address portion of a logical block address, hashing a pool identifier with a key and including the resulting hash value in a logical block address, or the like.

A key identifier identifies an associated data value, differentiating between data values with the same client identifier and pool identifier. The key-value mapping module 506 may assign and manage key identifiers and/or a client 116 may assign and manage key identifiers. Key identifiers may be assigned sequentially, or in another manner to ensure uniqueness. Keys are unique for a key-value store 518; and key identifiers are unique for a given client identifier and pool identifier to ensure that the keys remain unique. The size of a key and any sub-values such as client identifiers, pool identifiers, and key identifiers, may be selected based on a size of a logical address space 134 for the non-volatile memory device 120 or VSU 516, a number of anticipated data values, a number of anticipated clients 116, a number of anticipated pools per client 116, a number of anticipated data values per pool, or the like.

In certain embodiments, a key for a data value may be a known value that is predefined for several clients 116, so that each of the clients 116 may access the data value. In another embodiment, the key-value store module 306 may list keys for a client 116.

In one embodiment, the client interface module 504 receives key-value commands from one or more clients 116 over a key-value store interface or the like. For example, the client interface module 504 may provide a key-value API for clients 116 to access a key-value store 518. As described above, clients 116 may access the key-value store module 306 from the computing device 110, over a data network, or the like. The client interface module 504 may provide a key-value store interface to clients 116 internally within the computing device 110, over a data network, or the like.

The client interface module 504 may support various key-value commands, examples of which are described in greater detail below with regard to FIG. 7A. For example, in certain embodiments, the client interface module 504 may support one or more of a CREATE command, a POOL CREATE command, an OPEN command, a PUT command, a GET command, a DELETE command, a DELETE POOL command, a DELETE ALL command, a BEGIN command, a NEXT command, a GET CURRENT command, a GET STORE INFO command, a SET STORE METADATA, a GET POOL INFO command, a SET POOL METADATA command, a GET KEY INFO command, a REGISTER NOTIFICATION HANDLER command, a CLOSE command, a DESTROY command, a BATCH GET command, a BATCH PUT command, and/or other key-value commands.

In one embodiment, the device interface module 508 performs one or more operations on the non-volatile memory device 120 for the key-value store module 306. The device interface module 508, in certain embodiments, implements key-value commands from the client interface module 504 on the non-volatile memory device 120 using primitive operations that the non-volatile memory controller 124 provides.

In one embodiment, the device interface module 508 stores a data value to the non-volatile memory device 120, in response to a PUT command or the like for an associated key, using an ATOMIC WRITE operation. An ATOMIC WRITE operation, in certain embodiments, provides variable size writes to accommodate variable sized data values. The device interface module 508, in a further embodiment, in response to a GET command or the like for an associated key, uses an EXISTS operation to determine whether the non-volatile memory medium 122 stores a data value for the key. In response to a DELETE command or the like for a key, in one embodiment, the device interface module 508 uses a PTRIM operation to delete, erase, remove, or otherwise clear the associated data value from the non-volatile memory medium 122. By using primitive operations such as ATOMIC WRITE, EXIST, and PTRIM, in certain embodiments, the device interface module 508 stores and retrieves variable sized data values efficiently without wasting physical storage capacity of the non-volatile memory medium 122. Further, primitive operations such as ATOMIC WRITE, EXIST, and PTRIM, in one embodiment, obviate the need for additional key-value data structures such as a key-value index or the like, allowing the key-value mapping module 506 to use the logical-to-physical address mapping structure to map keys to physical locations for values without the overhead of additional levels of lookups or record keeping.

In one embodiment, the key-value store module 306 cooperates with the non-volatile memory controller 124 to optimize storage capacity recovery operations or other grooming operations for the non-volatile memory medium 122. For example, the key-value store module 306 may track key-value pairs for the non-volatile memory controller 124 so that the non-volatile memory controller 124 performs storage capacity recovery operations or other grooming operations for the entire key-value pair, so that key-value pair data and/or metadata stored on the non-volatile memory medium 122 is complete, is not separated, or the like.

The client 116, in the depicted embodiment, communicates one or more key-value store commands to the client interface module 504 over a key-value store interface provided by the client interface module 504, such as a key-value store API. Examples of key-value store commands, in various embodiments, may include one or more of a CREATE command, a POOL CREATE command, an OPEN command, a PUT command, a GET command, a DELETE command, a DELETE POOL command, a DELETE ALL command, an ITERATOR NIT command, a BEGIN command, a NEXT command, a GET CURRENT command, an ENUMERATE command, an EXPORT command, a GET STORE INFO command, a SET STORE METADATA, a GET POOL INFO command, a SET POOL METADATA command, a GET KEY INFO command, a SET KEY METADATA command, a REGISTER NOTIFICATION HANDLER command, a CLOSE command, a DESTROY command, a BATCH GET command, a BATCH PUT command, and the like.

Certain key-value store commands include a key 502, which the client 116 may send to the client interface module 504 as a parameter to a key-value store command. In the depicted embodiment, the client interface module 504 sends the key 502, with other key-value store command data or instructions, to the key-value mapping module 506, which determines a logical address 510 based on the received key 502. As described above, the key-value mapping module 506 may use a key 502 as a logical address 510, may hash a key 502 into a logical address 510, may hash a key 502 into a key address portion of a logical address 510 and add a value address portion to complete the logical address 510, or the like.

The key-value mapping module 506, in the depicted embodiment, is in communication with the non-volatile memory controller 124 to access and/or manipulate a logical-to-physical address mapping structure 514. The key-value mapping module 506, as described above, may cooperate with a mapping module 302 of the non-volatile memory controller 124 to store logical addresses 510 for key-value pairs in the logical-to-physical address mapping structure 514, to map logical addresses 510 for key-value pairs to physical locations of the data values on the non-volatile memory medium 122, to determine whether a key-value pair for a logical address 510 exists and is stored on the non-volatile memory medium 122, or the like. The key-value mapping module 506, in one embodiment, sends a determined logical address 510 for a data value to the device interface module 508.

In other embodiments, the key-value mapping module 506 and/or the client interface module 504 may send a physical location of a data value 512 on the non-volatile memory medium 122, other key-value store command data or instructions, or the like to the device interface module 508. The device interface module 508 executes one or more primitive operations that the non-volatile memory controller 124 provides, such as WRITE, ATOMIC WRITE, EXISTS, RANGE EXISTS, PTRIM, READ, RANGE READ, CONDITIONAL WRITE, or the like, to service a key-value store command from the client 116. The device interface module 508 may cooperate with the client interface module 504 to translate a key-value store command to one or more primitive operations of the non-volatile memory controller 124. The device interface module 508 may return a data value 512, key-value metadata 512, or the like to the client interface module 504 to include in a key-value store command response to the client 116.

The time sequence module 318, in certain embodiments, expires keys and associated data values from a key-value store 518, thereby deleting, erasing, removing, trimming, or otherwise clearing the expired keys and associated data values from the non-volatile memory medium 122 as described above. In one embodiment, the time sequence module 318 expires key-value pairs or other data automatically in response to an expiration event, such as an expiration request from a client 116, a key-value quota being satisfied, a predefined amount of time occurring since creation of a key-value pair, a predefined amount of time occurring since access of a key-value pair, a storage capacity recovery event for the non-volatile memory device 120, or the like. The time sequence module 318, in one embodiment, expires key-value pairs by age, expiring older keys in favor of newer keys. For example, in response to a key-value quota or another predefined threshold number of key-value pairs being satisfied, the time sequence module 318 may expire the oldest key-value pair so that the total number of key-value pairs does not exceed the key-value quota or other predefined threshold number of key-value pairs.

In one embodiment, the time sequence module 318 cooperates or coordinates with a garbage collection or storage capacity recovery process of the non-volatile memory device 120 to expire key-value pairs as described above with regard to the storage capacity recovery module 310. In a typical storage capacity recovery process, the storage capacity recovery module 310 selects an erase block of the non-volatile memory medium 122, such as a physical erase block, logical erase block, or the like, for storage capacity recovery, copies valid data from the selected erase block forward to retain the valid data in the non-volatile memory medium 122, and erases the selected erase block which becomes available to be reused to store other data. For example, the storage capacity recovery module 310 may copy valid data forward to an append point of a sequential, log-based writing structure preserved in the non-volatile memory medium 122, or the like.

In certain embodiments, instead of copying key-value pairs forward to retain the key-value pairs as part of a storage capacity recovery process for an erase block, the time sequence module 318 expires key-value pairs stored in an erase block in response to a storage capacity recovery event for the erase block. In one embodiment, the storage capacity recovery module 310 performs storage capacity recovery in a first-in-first-out (FIFO) order beginning with the oldest data at a tail of the sequential, log-based writing structure and proceeding toward the newest data at a head of the sequential, log-based writing structure. In this manner, key-value pairs are expired in a FIFO order, with older key-value pairs being expired prior to newer key-value pairs in a temporal order.

Expiring key-value pairs instead of copying them forward, in one embodiment, reduces write amplification in the non-volatile memory device 120. As described above, write amplification is the rewriting or moving of data during a storage capacity recovery or garbage collection process, causing the same data originally written in response to a storage request to be written more than once. Write amplification can increase the number of writes of a non-volatile memory device 120, consume write bandwidth of a non-volatile memory device 120, reduce a usable lifetime of a non-volatile memory device 120, and otherwise reduce performance of a non-volatile memory device 120. In certain embodiments, reducing write amplification by expiring key-value pairs instead of copying them forward allows the key-value store 518 to operate at or near peak performance indefinitely with little or no write amplification.

In certain embodiments, the notification module 304 notifies a client 116, the key-value store module 306, or the like in response to expiring a key-value pair, as described above. In a further embodiment, the notification module 304 enumerates to a client 116, the key-value store module 306, or the like which key-value pairs the time sequence module 318 has expired, listing the expired key-value pairs or the like. The notification module 304, in various embodiments, may perform a callback to enumerate expired key-value pairs, may maintain a log of expired key-value pairs, or the like.

Figure 6:
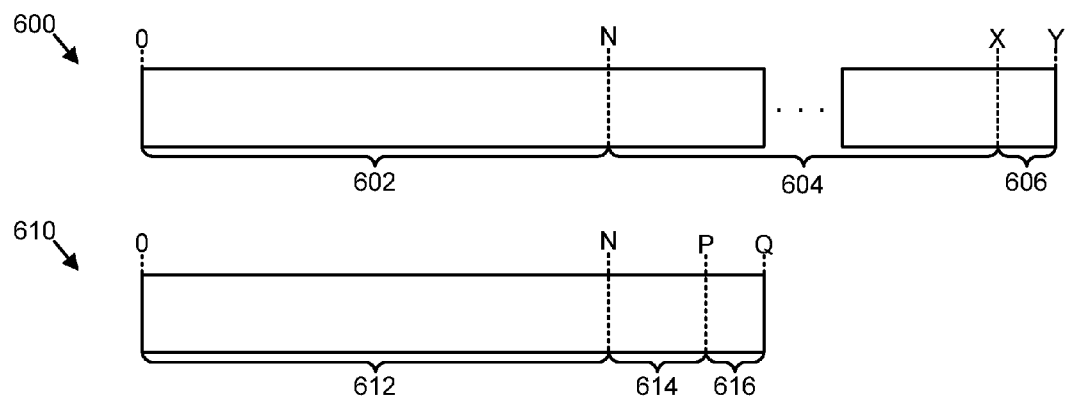
FIG. 6 is a schematic block diagram illustrating one embodiment of a logical address space and a physical storage capacity for a non-volatile memory device.

FIG. 6 depicts one embodiment of a logical address space 600 and a physical storage capacity 610 for a non-volatile memory device 120. In the depicted embodiment, the logical address space 600 is a sparse address space that is larger than the physical storage capacity 610 of the non-volatile memory device 120. A first set of LBAs 602 corresponds to a reported capacity 612 of the non-volatile memory device 120. The reported capacity 612, in certain embodiments, is the capacity that is discoverable and useable by clients 116, operating systems, computer devices 110, and the like. The first set of LBAs 602 is available to clients 116 over a block device interface.

The reported capacity 612, in the depicted embodiment, is less than the total available physical storage capacity 610 of the non-volatile memory device 120, as the non-volatile memory device 120 includes reserve capacity 614 for bad block substitutions, for storing metadata, for storing invalid data, and the like and key-value store capacity 616 for storing key-value store data. The reserve capacity 614 and the key-value store capacity 616, in certain embodiments, may be managed together, as available metadata capacity or system capacity, and adjusted based on capacity demands. While the reported capacity 612, the reserve capacity 614, and the key-value store capacity 616 are depicted logically as being separated, as described above, in certain embodiment, workload data, key-value store data, system metadata, and the like use the same write path and are written to an append point of a sequential, log-based writing structure, so that the workload data, key-value store data, system metadata, and the like are intermingled on the physical non-volatile memory medium 122. Further, in the depicted embodiment, each set of LBAs 602, 604, 606 is illustrated as a contiguous range of LBAs. In other embodiments, the first set of LBAs 602 and the key-value store set of LBAs 606 may be noncontiguous, interspersed using one or more hashing functions or other address mapping functions, or otherwise intermingled through the logical address space 600, instead of being disposed in contiguous ranges.

In the depicted embodiment, a key-value store set of LBAs 606 comprises a restricted set of LBAs 606 and is a part of a larger restricted set of LBAs 604, 606. Alternatively, in another embodiment, the key-value store set of LBAs 606 may be a single restricted set of LBAs 606, with the set of LBAs 604 between LBA N and LBA X not being a restricted set. A restricted set of LBAs is inaccessible using a block device interface. In one embodiment, the size of the key-value store set of LBAs 606 is dynamic, and may grow or shrink dynamically as data values are added to or removed from the key-value store 518. In another embodiment, the size of the key-value store set of LBAs 606 is static. For example, a client 116, in one embodiment, may request a certain size for a key-value store set of LBAs 606 using a CREATE command, requesting a certain number of keys, requesting a certain size of key-value store index, or the like and the size for the key-value store set of LBAs 606 may be based on the client request.

In another embodiment, the key-value store set of LBAs 606 is associated with a VSU 516 of a key-value store 518. The size of the key-value store set of LBAs 606, in certain embodiments, is selected not to exceed the reserve capacity 614 of the non-volatile memory device 120. In other embodiments, the size of the key-value store set of LBAs 606 may be allowed to grow into the reported capacity 612. In one embodiment, the size allocated for the key-value store set of LBAs 606 is a logical or virtual allocation and does not use or reserve physical storage capacity 610 of the non-volatile memory device 120 until data values are stored in the key-value store set of LBAs 606 and the corresponding LBAs are mapped to physical locations on the non-volatile memory device 120 that store the data values.

In embodiments where one or more additional LBAs 604 exist in the logical address space 600, the additional LBAs 604 may be restricted or unrestricted. The additional LBAs 604, in one embodiment, may be unused. In another embodiment, the additional LBAs 604 may be allocated to additional key-value stores 518, or for other functions of the non-volatile memory device 120.

Figure 7A:
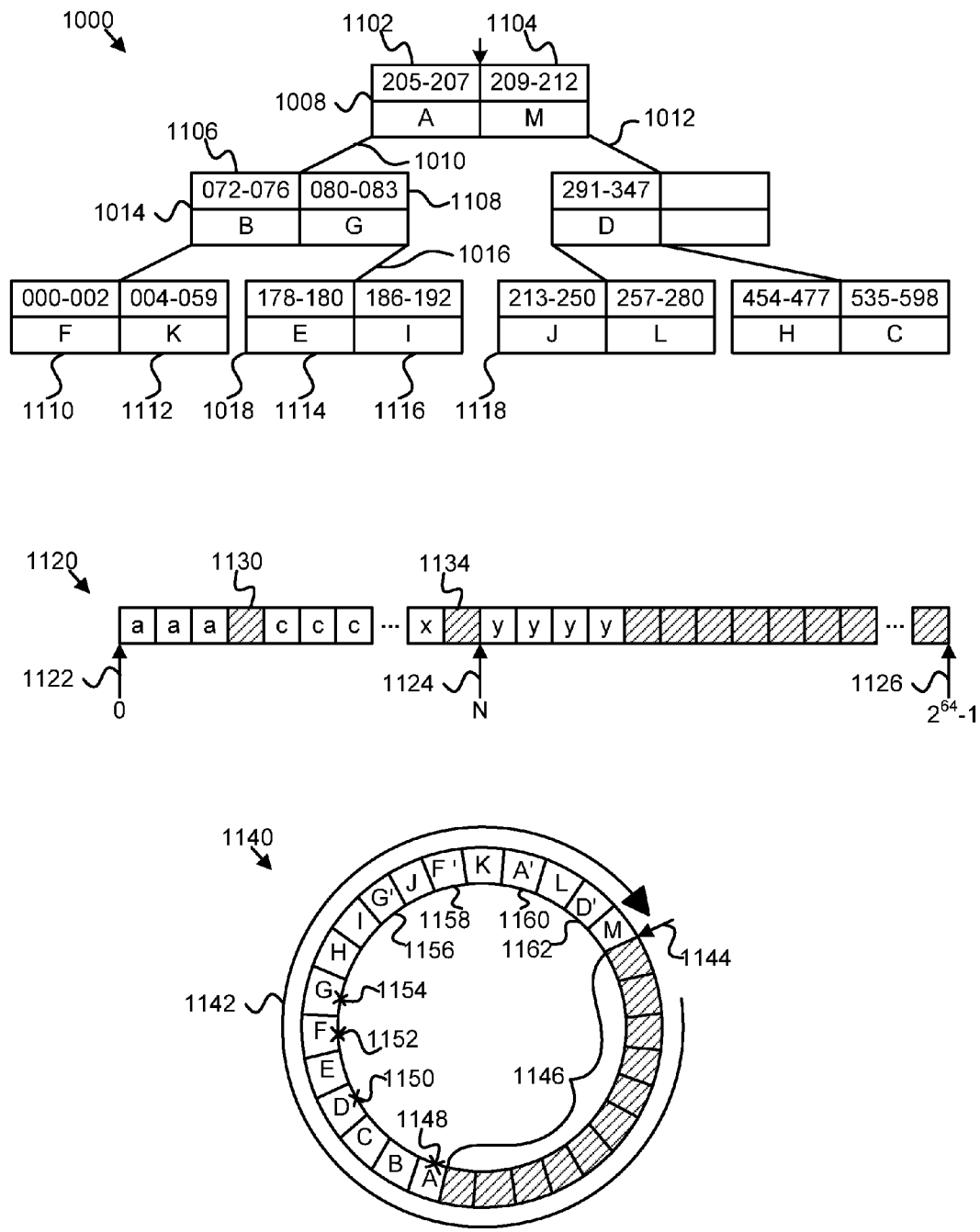
FIG. 7A is a schematic block diagram illustrating one embodiment of a logical-to-physical address mapping structure, a logical address space, and a sequential, log-based writing structure.
Figure 7B:
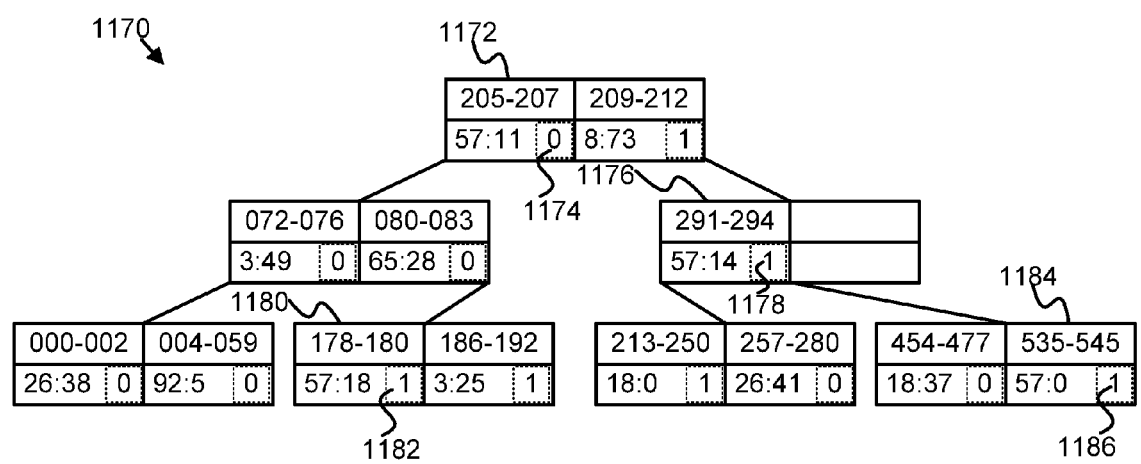
FIG. 7B is a schematic block diagram illustrating one embodiment of a logical-to-physical address mapping structure.

FIG. 7A depicts one embodiment of a logical-to-physical address mapping structure 1000, a logical address space 1120, and a sequential, log-based, append-only writing structure 1140. The logical-to-physical address mapping structure 1000, in one embodiment, is maintained by the mapping module 302 to map LBAs or other logical addresses to physical locations on the non-volatile memory media 122. The logical-to-physical address mapping structure 1000, in the depicted embodiment, is a B-tree with several entries. In the depicted embodiment, the nodes of the logical-to-physical address mapping structure 1000 include direct references to physical locations in the non-volatile memory device 120. In other embodiments, the logical-to-physical address mapping structure 1000 may include links that map to entries in a reverse map, or the like. The logical-to-physical address mapping structure 1000, in various embodiments, may be used either with or without a reverse map. In other embodiments, the references in the logical-to-physical address mapping structure 1000 may include alpha-numerical characters, hexadecimal characters, pointers, links, and the like.

The logical-to-physical address mapping structure 1000, in the depicted embodiment, includes a plurality of nodes. Each node, in the depicted embodiment, is capable of storing two entries. In other embodiments, each node may be capable of storing a greater number of entries, the number of entries at each level may change as the logical-to-physical address mapping structure 1000 grows or shrinks through use, or the like.

Each entry, in the depicted embodiment, maps a variable length range of LBAs of the non-volatile memory device 120 to a physical location in the non-volatile memory media 122 for the non-volatile memory device 120. Further, while variable length ranges of LBAs, in the depicted embodiment, are represented by a starting address and an ending address, in other embodiments, a variable length range of LBAs may be represented by a starting address and a length, or the like. In another embodiment, instead of storing variable length ranges of LBAs, the logical-to-physical address mapping structure 1000 may store a single LBA or other logical address in an entry as a starting address for a data value and/or for associated key-value metadata.

In one embodiment, the capital letters 'A' through 'M' represent a logical or physical erase block in the physical non-volatile memory media 122 of the non-volatile memory device 120 that stores the data of the corresponding range of LBAs. In other embodiments, the capital letters may represent other physical addresses or locations of the non-volatile memory device 120. In the depicted embodiment, the capital letters 'A' through 'M' are also depicted in the log-based writing structure 1140 which represents the physical non-volatile memory media 122 of the non-volatile memory device 120.

In the depicted embodiment, membership in the logical-to-physical address mapping structure 1000 denotes membership (or storage) in the non-volatile memory device 120. In another embodiment, an entry may further include an indicator of whether the non-volatile memory device 120 stores data corresponding to a logical block within the range of LBAs, data of a reverse map, and/or other data.

In the depicted embodiment, the root node 1008 includes entries 1102, 1104 with noncontiguous ranges of LBAs. A "hole" exists at LBA "208" between the two entries 1102, 1104 of the root node. In one embodiment, a "hole" indicates that the non-volatile memory device 120 does not store data corresponding to one or more LBAs corresponding to the "hole." In one embodiment, the non-volatile memory device 120 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 1106, 1108 of the node 1014, between the entries 1110, 1112 of the left child node of the node 1014, between entries 1114, 1116 of the node 1018, and between entries of the node 1118. In one embodiment, similar "holes" may also exist between entries in parent nodes and child nodes. For example, in the depicted embodiment, a "hole" of LBAs "060-071" exists between the left entry 1106 of the node 1014 and the right entry 1112 of the left child node of the node 1014.

The "hole" at LBA "003," in the depicted embodiment, can also be seen in the logical address space 1120 of the non-volatile memory device 120 at logical address "003" 1130. The hash marks at LBA "003" 1140 represent an empty location, or a location for which the non-volatile memory device 120 does not store data. The "hole" at LBA 1134 in the logical address space 1120, is due to one or more block I/O requests with noncontiguous ranges, a PTRIM or other deallocation command to the non-volatile memory device 120, or the like.

The logical address space 1120 of the non-volatile memory device 120, in the depicted embodiment, is larger than the physical storage capacity and corresponding storage device address space of the non-volatile memory device 120. In the depicted embodiment, the non-volatile memory device 120 has a 64 bit logical address space 1120 beginning at logical address "0" 1122 and extending to logical address "$2^{64}-1$" 1126. Because the storage device address space corresponds to only a subset of the logical address space 1120 of the non-volatile memory device 120, the rest of the logical address space 1120 may be restricted, and used for a key-value store 518 as described above, or used for other functions of the non-volatile memory device 120.

The sequential, log-based, append-only writing structure 1140, in the depicted embodiment, is a logical representation of the physical non-volatile memory media 122 of the non-volatile memory device 120. In certain embodiments, the non-volatile memory device 120 stores data sequentially, appending data to the log-based writing structure 1140 at an append point 1144. The non-volatile memory device 120, in a further embodiment, uses a storage space recovery process, such as a garbage collection module or other storage space recovery module that re-uses non-volatile memory media 122 storing deallocated/unused logical blocks. Non-volatile storage media storing deallocated/unused logical blocks, in the depicted embodiment, is added to an available storage pool 1146 for the non-volatile memory device 120. By clearing invalid data from the non-volatile memory device 120, as described above, and adding the physical storage capacity corresponding to the cleared data back to the available storage pool 1146, in one embodiment, the log-based writing structure 1140 is cyclic, ring-like, and has a theoretically infinite capacity.

In the depicted embodiment, the append point 1144 progresses around the log-based, append-only writing structure 1140 in a circular pattern 1142. In one embodiment, the circular pattern 1142 wear balances the non-volatile memory media 122, increasing a usable life of the non-volatile memory media 122. In the depicted embodiment, a garbage collection module or other storage capacity recovery process has marked several blocks 1148, 1150, 1152, 1154 as invalid, represented by an "X" marking on the blocks 1148, 1150, 1152, 1154. The garbage collection module, in one embodiment, will recover the physical storage capacity of the invalid blocks 1148, 1150, 1152, 1154 and add the recovered capacity to the available storage pool 1146. In the depicted embodiment, modified versions of the blocks 1148, 1150, 1152, 1154 have been appended to the log-based writing structure 1140 as new blocks 1156, 1158, 1160, 1162 in a read, modify, write operation or the like, allowing the original blocks 1148, 1150, 1152, 1154 to be recovered.

In one embodiment, workload data and key-value store data are intermingled in the log-based writing structure 1140. The logical-to-physical address mapping structure 1000, in a further embodiment, maps LBAs for both workload data and key-value store data to physical locations on the non-volatile memory media 122 of the log-based writing structure 1140. In this manner, a garbage collection module or other storage recovery process services both workload data and key-value store data, and both workload data and key-value store data receive the same data protection characteristics.

FIG. 7B depicts one embodiment of a logical-to-physical address mapping structure 1170. In the depicted embodiment, the logical-to-physical address mapping structure 1170 is substantially similar to the logical-to-physical address mapping structure 1000 of FIG. 7A, with similar entries and nodes. The logical-to-physical address mapping structure 1170, in the depicted embodiment, maps logical addresses to physical locations in the non-volatile memory device 120.

In one embodiment, the logical-to-physical address mapping structure 1170 may include metadata 1174, 1178, 1182, 1186 for managing data stored at logical addresses of the non-volatile memory device 120. For example, where the non-volatile memory device 120 acts as a cache for a backing store device, each node of the logical-to-physical address mapping structure 1170 may include a dirty indicator that may indicate if data at the logical address provided in the node structure is dirty. In one embodiment, each node of the logical-to-physical address mapping structure 1170 may also include a physical location for the range of logical addresses, such as a logical or physical erase block and an offset within the erase block where the data is stored. In one example, node 1172 of the logical-to-physical address mapping structure 1170 includes a physical location of 57:11, which indicates that corresponding data is stored in LEB 57 at offset 11 in the non-volatile memory device 120. In another example, node 1180 of the logical-to-physical address mapping structure 1170 includes a physical location of 57:18, which indicates that the data is located in LEB 57 at offset 18.

The mapping module 302, in certain embodiments, stores metadata such as a read request count, one or more read/write indicators, dirty/clean indicators, recent/frequent indicators, valid/invalid indicators, time sequence metadata (e.g., an epoch identifier, a timestamp, a sequence number, a date, a time) or the like in entries of the logical-to-physical address mapping structure 1170, such as the depicted metadata 1174, 1178, 1182, 1186, co-located in entries with the logical-to-physical mappings. As described above, the condition module 204 may access metadata 1174, 1178, 1182, 1186 to determine whether associated entries satisfy a condition or filter of an iteration request. The mapping module 302, in a further embodiment, maintains the logical-to-physical address mapping structure 1170, with associated metadata 1174, 1178, 1182, 1186, in volatile memory, such as the volatile memory 112 of the host computing device 110, volatile memory of the non-volatile memory device 120, or the like. In certain embodiments, the mapping module 302 may periodically store the logical-to-physical address mapping structure 1170, logical-to-physical mappings, and/or metadata 1174, 1178, 1182, 1186, or the like to the non-volatile memory media 122 of the non-volatile memory device 120 to persist them in non-volatile storage.

Figure 8:
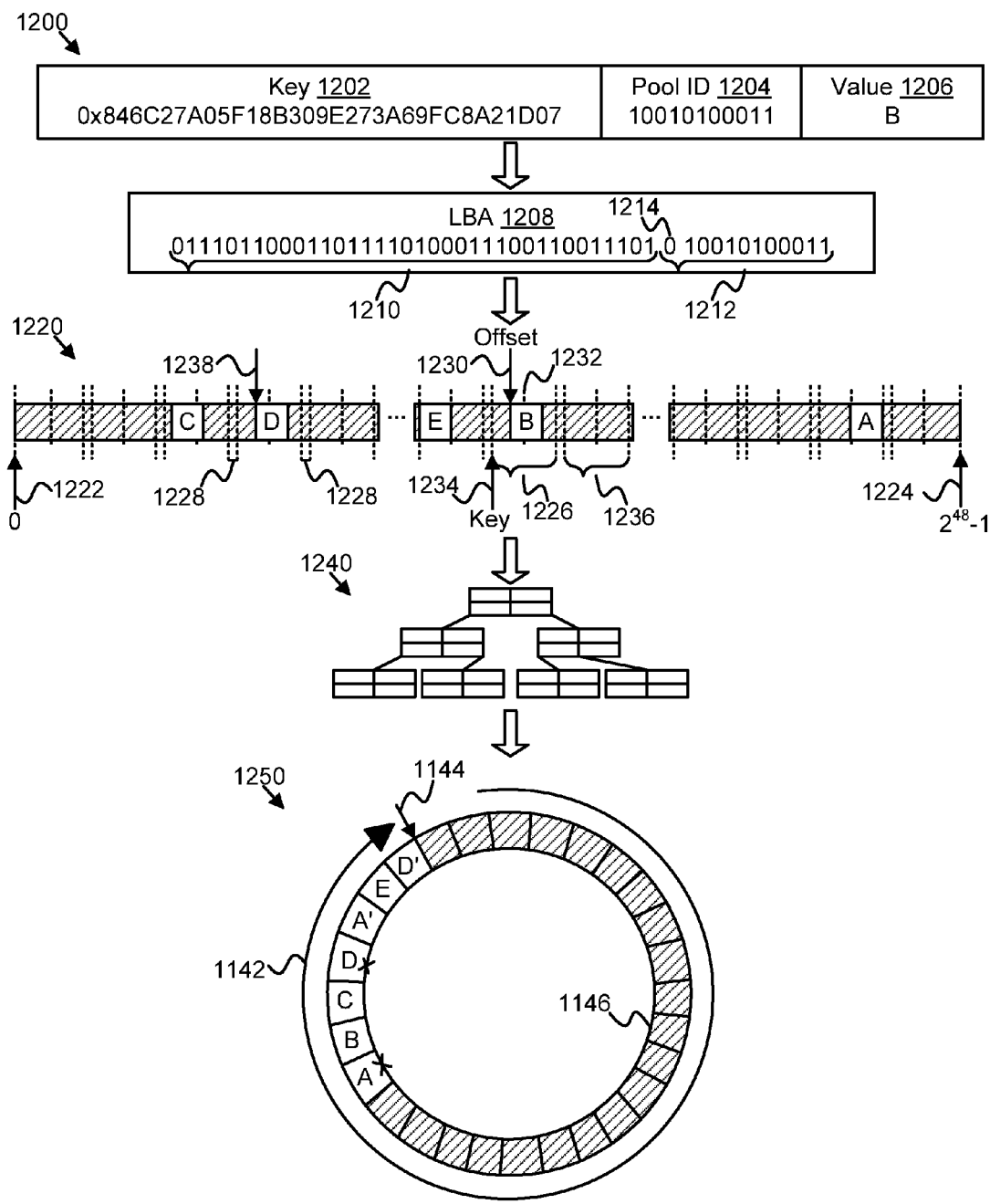
FIG. 8 is a schematic block diagram illustrating one embodiment of a key-value pair, a logical address, a logical address space, a logical-to-physical address mapping structure, and a log-based writing structure.

FIG. 8 depicts one embodiment of a key-value pair 1200, a logical address 1208, a logical address space 1220, a logical-to-physical address mapping structure 1240, and a log-based writing structure 1250. In certain embodiments, the logical address space 1220, the logical-to-physical address mapping structure, and the log-based writing structure may be substantially similar to the logical address space 1120, the logical-to-physical address mapping structure 1000, and the log-based writing structure 1140 described above with regard to FIG. 7A.

The client interface module 504 may receive the key-value pair 1200 from a client 116 as part of a PUT command and store the key-value pair 1200 in a key-value store 518, the get module 708 may retrieve the key-value pair 1200 from a key-value store 518 for a client 116 in response to a GET command, or the like as described above.

In one embodiment, the key-value pair 1200 includes a key 1202, a pool identifier 1204, and a data value 1206. The key 1202, in the depicted embodiment, comprises a 128 bit value represented in hexadecimal. The key-value mapping module 506, in certain embodiments, in response to a PUT command to store the key-value pair 1200, a GET command to retrieve the key-value pair 1200, or the like, hashes the key 1202 to determine a hash value from the key 1202. In a further embodiment, the key-value mapping module 506 may hash the key 1202 together with the pool identifier 1204 to determine the hash value. Hashing the key 1202 and the pool identifier 1204 together, in certain embodiments, may decrease the likelihood of hash collisions, may allow the use of similar keys 1202 in different key-value pools, or the like.

The key-value mapping module 506 may use the determined hash value as a key address portion 1210 of the logical address 1208 corresponding to the key-value pair 1200. In the depicted embodiment, the key address portion 1210 of the logical address 1208 is a 36 bit value and the key-value mapping module 506 hashes the 128 bit key 1202 into the 36 bit key address portion 1210.

The pool identifier 1204, in the depicted embodiment, comprises an 11 bit value, which the key-value store module 306 encodes directly into a value address portion 1212 of the logical address 1208. In other embodiments, as described above, the key-value store module 306 may hash a larger pool identifier 1204 into a smaller value address portion 1212. The value address portion 1212, in the depicted embodiment, includes a spacing portion 1214 of a single bit. The spacing portion 1214, in other embodiments, may comprise more than a bit, may share bits with the encoded pool identifier 1204 in the value address portion 1212, or the like. For example, the key-value store module 306 may encode the spacing portion 1214 and the pool identifier 1204 together so that the spacing portion 1214 and the pool identifier 1204 share bits of the value address portion 1212 by enforcing a cap on values that the value address portion 1212 may take, limiting the encoded pool identifier 1204 to less than the maximum encodable value provided by the value address portion. Allocating a spacing portion 1214, in certain embodiments, ensures that the data value 1206 does not extend beyond a region 1226 of the logical address space 1220 allocated for the key-value pair 1200 by limiting the range of values that the value address portion 1212 may take. For example, a spacing portion 1214 comprising a binary zero positioned as depicted in FIG. 8 ensures that the value address portion 1212 does not exceed half of the maximum encodable value of the value address portion 1212.

The size and/or location of the spacing portion 1214, in one embodiment, is selected so that the value address portion 1212 provides a region 1226 of the logical address space 1220 large enough to fit an offset 1230 associated with the pool identifier 1204 and the data value 1206 stored at the offset 1230. A spacing portion 1214 of 1 bit, disposed adjacent to the encoded pool identifier 1204 in the logical address 1208, may divide each region 1226 of the logical address space 1220 in half 1232, ensuring that the offset 1230 falls in the first, lower order half of the region 1226, providing up to the second, higher order half of the region for addresses to blocks/sectors stored as the data value 1206. In other embodiments, the spacing portion 1214 may divide each region 1226 into portions with ratios other than one half, balancing the number of available key-value pools with the maximum size of data values 1206 supported.

In the depicted embodiment, with a pool identifier 1204 of 11 bits and a spacing portion 1214 of 1 bit, each half of the region 1226 is about 1 mebibyte, as described above in the example with regard to the key-value store module 306. In one embodiment, the spacing portion 1214 may comprise a binary zero so that the offset falls within the first, lower order half of the region 1226. While the spacing portion 1214 is depicted as separate from the pool identifier 1204, in certain embodiments, the spacing portion 1214 may be part of the pool identifier 1204, integrated/encoded with the pool identifier 1204, or the like. For example, one or more highest order bits of the pool identifier 1204 may comprise the spacing portion 1214, may be encoded or hashed into the spacing portion 1214, may comprise a binary zero, or the like.

The logical address space 1220, in one embodiment, begins at logical address "0" 1222 and extends to logical address "$2^{48}$-1" 1224. Allocating a range of lower order bits as a value address portion 1212, in certain embodiments, logically divides or segments the logical address space 1220 into equally sized regions 1226, slots, or compartments for each key-value pair 1200. The region 1226 associated with a key-value pair 1200, in one embodiment, begins at the logical address associated with the key address portion 1210, with the remainder of the logical address 1208 (e.g., the value address portion 1212) set to binary zeroes. As described above, in certain embodiments, a maximum data value size, an allocated size of each region 1226, or the like are selected to provide a buffer 1228 of at least one logical address between adjacent regions 1226. In the depicted embodiment, each region 1226 is sized so that a data value 1206 of a maximum size, stored at a maximum offset 1230 (e.g. at the half 1232 marker provided by the spacing portion 1214), will not extend into the buffer 1228. In other embodiments, regions 1226 may be disposed directly adjacent to each other at contiguous logical addresses, without a buffer 1228.

The data value 1206 is represented as "B" in the depicted embodiment. The data value 1206 is stored in the logical address space 1220 at the logical address 1208 for the key-value pair 1200, which includes the key address portion 1210 and the value address portion 1212, the key address portion 1210 determining a starting logical address 1234 for the region 1226 and the value address portion 1212 determining an offset 1230 within the region 1226 where the data value 1206 and associated key-value metadata are stored. If the key address portion 1210 is incremented by one, instead of mapping to the starting logical address 1234 and the associated region 1226, the incremented key address portion 1210 would map to the next region 1236.

The offset 1230 for the key-value pair 1200, in the depicted embodiment, is equal and identical to an offset 1238 for the data value "D," indicating that the key-value pair 1200 is a member of the same key-value pool as the key-value pair with the value "D." In one embodiment, offsets for key-value pairs 1200 are equal if the value address portions 1212 for the key-value pairs 1200 are equal, indicating that the key-value pairs 1200 are members of the same key-value pool. In embodiments where the key-value store module 306 hashes pool identifiers 1204 into the value address portion 1212, equal value address portions 1212 may potentially indicate a hash collision, and the key-value store module 306 may retrieve one or more pool identifiers 1204 stored as key-value metadata with the corresponding data values 1206 on the non-volatile memory media 122 to verify that the pool identifiers 1204 are equal, and that a hash collision has not occurred.

In one embodiment, the logical-to-physical address mapping structure 1240 may be substantially similar to the logical-to-physical address mapping structure 1000 described above with regard to FIG. 7A. As described above, in certain embodiments, the key-value mapping module 506, in cooperation with the key-value store module 306 or the like, upon determining the logical address 1220 from the key 1202 and the pool identifier 1204, uses the logical-to-physical address mapping structure 1240 to map the determined logical address 1208 to a physical location in the log-based writing structure 1250 of the non-volatile memory media 122.

In certain embodiments, while the key-value pairs 1200 are organized by key address portion 1210 in the logical address space 1220 and may be separated by buffers 1228, offsets 1230, 1238, or the like, the key-value pairs 1200 may be organized sequentially within the log-based writing structure 1250, in the order in which write or update operations for the key-value pairs 1200 were received from clients 116. For example, logical erase blocks of the non-volatile memory media 122 may be assigned sequence numbers to form the log-based writing structure 1250 and the device interface module 508 in cooperation with the non-volatile memory controller 104 may write key-value pairs 1200 sequentially within the logical erase blocks progressing through the sequence of logical erase blocks to preserve the order of operations within the log-based writing structure 1250.

Figure 9:
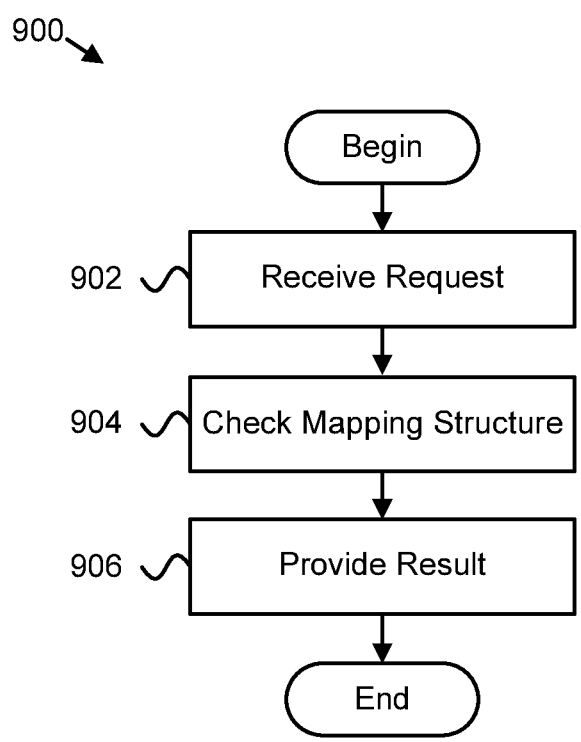
FIG. 9 is a schematic flow chart diagram illustrating one embodiment of a method for conditional iteration.

FIG. 9 depicts one embodiment of a method 900 for conditional iteration. The method 900 begins and the receiving module 202 receives 902 an iteration request including a condition. The condition module 204 checks 904 a logical-to-physical address mapping structure 1000, 1170 for entries satisfying the condition of the request. The result module 206 provides 906 a result for the request based on one or more entries satisfying the condition of the request and the method 900 ends.

Figure 10:
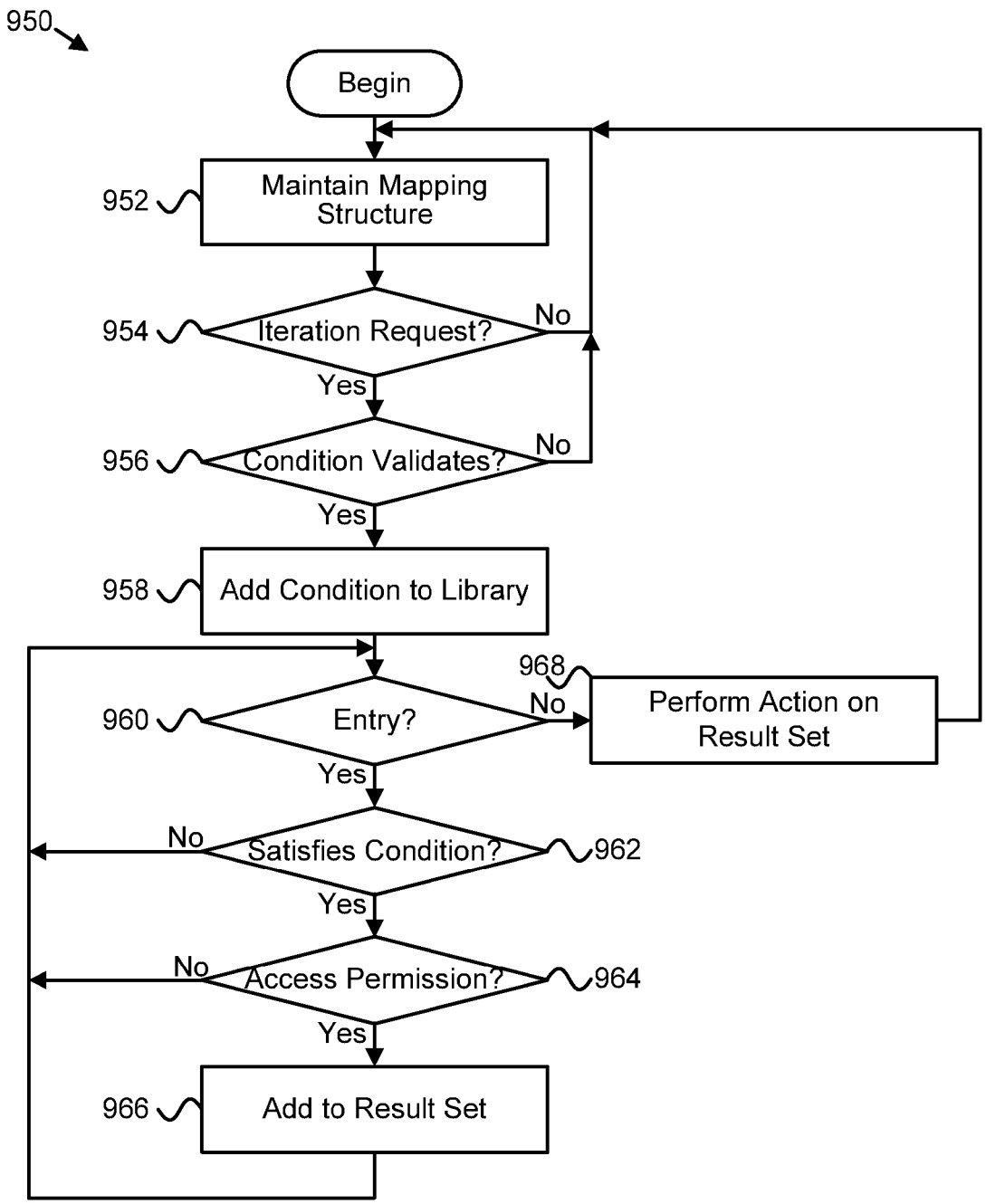
FIG. 10 is a schematic flow chart diagram illustrating another embodiment of a method for conditional iteration.

FIG. 10 depicts another embodiment of a method 950 for conditional iteration. The method 950 begins and the mapping module 302 maintains 952 a logical-to-physical address mapping structure 1000, 1170 mapping logical addresses for data to physical locations of the data in a sequential log-based writing structure 400, 440, 1140, 1250 preserved in the non-volatile memory media 122. If the receiving module 202 does not receive 954 an iteration request, the mapping module 302 continues to maintain 952 the logical-to-physical address mapping structure 1000, 1170.

If the receiving module 202 receives 954 an iteration request, the validation module 304 validates 956 whether a condition of the received 954 iteration request is secure. If the validation module 304 fails to validate 956 the condition, the method 950 continues without satisfying the iteration request and the mapping module 302 continues to maintain 952 the logical-to-physical address mapping structure 1000, 1170. If the validation module 304 successfully validates 956 the condition, the condition library module 308 adds 958 the validated 956 condition to a condition library of approved conditions.

The condition module 204 traverses the logical-to-physical address mapping structure 1000, 1170 to locate 960 a next entry. If the condition module 204 locates 960 an entry, the condition module 204 determines 962 whether the entry satisfies the condition of the iteration request. If the condition module 204 determines 962 that the entry satisfies the condition of the iteration request, the access control module 312 determines 964 whether a requesting client 116 has permission to access the entry. If the access control module 312 determines 964 that the requesting client 116 has permission to access the entry, the result module 206 adds 966 the entry, a logical address of the entry, data of the entry, or the like to a result set for the iteration request.

If the condition module 204 determines 962 that the entry fails to satisfy the condition, if the access control module 312 determines 964 that the requesting user does not have permission to access the entry, or if the result module 206 adds 966 the entry to the result set, the condition module 204 continues to traverse the logical-to-physical address mapping structure 1000, 1170 determining 960 whether an additional entry exists. Once the condition module 204 determines 960 that no additional entry exists in the logical-to-physical address mapping structure 1000, 1170, the result module 206 performs 968 an action of the iteration request and the method 950 continues with the mapping module 302 continuing to maintain 952 the logical-to-physical mapping structure 1000, 1170.

A means for traversing entries of a logical-to-physical mapping structure 1000, 1170 for a non-volatile storage device 120, in various embodiments, may include a conditional iteration module 150, a storage management layer 130, a non-volatile memory controller 124, a condition module 204, a mapping module 302, other logic hardware, and/or other executable code stored on a computer readable storage medium. Other embodiments may include similar or equivalent means for traversing entries of a logical-to-physical mapping structure 1000, 1170 for a non-volatile storage device 120.

A means for matching an entry in a logical-to-physical mapping structure 1000, 1170 to a filter definition without accessing a non-volatile storage medium 122 of a non-volatile storage device 120, in various embodiments, may include a conditional iteration module 150, a storage management layer 130, a non-volatile memory controller 124, a condition module 204, other logic hardware, and/or other executable code stored on a computer readable storage medium. Other embodiments may include similar or equivalent means for matching an entry in a logical-to-physical mapping structure 1000, 1170 to a filter definition without accessing a non-volatile storage medium 122 of a non-volatile storage device 120.

A means for performing an action for a matching entry, in various embodiments, may include a conditional iteration module 150, a storage management layer 130, a non-volatile memory controller 124, a result module 206, other logic hardware, and/or other executable code stored on a computer readable storage medium. Other embodiments may include similar or equivalent means for performing an action for a matching entry.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving a request to traverse data stored by a non-volatile storage device, the request associated with an iteration condition, the iteration condition identifying a subset of the data;
   checking an address mapping structure for entries satisfying the iteration condition for the request, wherein the address mapping structure is distinct from the data stored by the non-volatile storage device; and
   providing a result for the request based on one or more entries satisfying the iteration condition for the request based on the identified subset of the data.

2. The method of claim 1, wherein checking the address mapping structure is performed in kernel-space such that entries of the address mapping structure failing to satisfy the iteration condition are not copied to user-space.

3. The method of claim 2, wherein the request comprises a system call received in kernel-space from a client executing in user-space.

4. The method of claim 1, wherein the iteration condition is defined by a client from which the request is received.

5. The method of claim 4, further comprising validating the client defined iteration condition and adding the validated iteration condition to a condition library for selection by clients in requests.

6. The method of claim 1, further comprising limiting the result to entries which a requesting client has permission to access.

7. The method of claim 1, wherein the result comprises a result set including a member for each entry that satisfies the iteration condition for the request.

8. The method of claim 1, wherein the result comprises a result for a next entry satisfying the iteration condition for the request relative to an iterator position in the address mapping structure.

9. The method of claim 1, wherein the address mapping structure comprises a logical-to-physical address mapping structure comprising entries mapping logical addresses for the data to physical locations of the data in the non-volatile storage device.

10. The method of claim 9, wherein the iteration condition applies to the logical addresses of the address mapping structure such that the entries of the address mapping structure are checked without accessing the data in the non-volatile storage device.

11. The method of claim 9, wherein the iteration condition applies to metadata stored in the entries of the address mapping structure with the logical addresses such that the entries of the address mapping structure are checked without accessing the data in the non-volatile storage device.

12. The method of claim 11, wherein the metadata comprises time sequence metadata associated with an order in which the data was written to the non-volatile storage device.

13. The method of claim 11, wherein the logical addresses are members of a sparse logical address space and at least one entry in the address mapping structure is associated with a key-value pair, and a key of the key-value pair is encoded by a logical address of the at least one entry.

14. The method of claim 13, wherein the iteration condition applies to the key of the key-value pair.

15. The method of claim 13, wherein the logical address of the at least one entry includes a value address portion that does not encode the key for the key-value pair, the value address portion sized to address at least a maximum size for a value of the key-value pair.

16. The method of claim 15, wherein the value address portion encodes a pool identifier for the key-value pair and the iteration condition applies to the pool identifier.

17. An apparatus comprising:
   a mapping module configured to maintain a logical-to-physical mapping structure, the logical-to-physical mapping structure mapping logical addresses for data to locations for the data in a sequential log structure of a non-volatile memory media;
   a condition module configured to locate an entry in the logical-to-physical mapping structure, the entry satisfying a predicate of an iteration request, the iteration request comprising a request to traverse the data stored by the non-volatile memory media, the predicate identifying a subset of the data, wherein the logical-to-physical mapping structure is distinct from the data stored by the non-volatile memory media; and
   a result module configured to return a result based on the located entry.

18. The apparatus of claim 17, further comprising a position module configured to determine an iterator position in the logical-to-physical mapping structure, the entry located by the condition module comprising a next entry relative to the iterator position in the logical-to-physical mapping structure, wherein the next entry is next relative to the iterator position in one of a logical address order and a temporal order for the entries.

19. The apparatus of claim 17, further comprising a validation module configured to validate security of the predicate of the iteration request and a condition library module configured to add the validated predicate to a condition library for selection by clients in iteration requests.

20. An apparatus comprising:
- means for traversing entries of a logical-to-physical mapping structure for a non-volatile storage device in response to a request to traverse data stored by the non-volatile storage device, the request associated with a filter definition, the filter definition identifying a subset of the data;
- means for matching an entry in the logical-to-physical mapping structure to the filter definition without accessing a non-volatile storage medium of the non-volatile storage device, wherein the logical-to-physical mapping structure is distinct from the data stored by the non-volatile storage device; and
- means for performing an action for the matching entry.

* * * * *